US012756752B2

(12) United States Patent
Kawashima et al.

(10) Patent No.: US 12,756,752 B2
(45) Date of Patent: Oct. 6, 2026

(54) PROCESSING SYSTEM, AND PROCESSING METHOD

(71) Applicant: NTT, Inc.

(72) Inventors: Masahisa Kawashima, Tokyo (JP); Daisuke Hamuro, Tokyo (JP); Yoshinori Matsuo, Tokyo (JP); Takeharu Eda, Tokyo (JP); Akira Sakamoto, Tokyo (JP); Shohei Enomoto, Tokyo (JP); Kyoku Shi, Tokyo (JP)

(73) Assignee: NTT, Inc., Tokyo (JP)

( * ) Notice: Subject to any disclaimer, the term of this patent is extended or adjusted under 35 U.S.C. 154(b) by 919 days.

(21) Appl. No.: 18/010,206

(22) PCT Filed: Jun. 15, 2020

(86) PCT No.: PCT/JP2020/023482
§ 371 (c)(1),
(2) Date: Dec. 13, 2022

(87) PCT Pub. No.: WO2021/255803
PCT Pub. Date: Dec. 23, 2021

(65) Prior Publication Data
US 2023/0224360 A1 Jul. 13, 2023

(51) Int. Cl.
*H04L 67/1001* (2022.01)
*G06F 9/50* (2006.01)
(Continued)

(52) U.S. Cl.
CPC .......... *H04L 67/1001* (2022.05); *G06F 9/505* (2013.01); *G06F 9/5088* (2013.01);
(Continued)

(58) Field of Classification Search
CPC ............ H04L 67/1001; H04L 67/1095; H04L 12/283; H04L 67/12; H04L 41/14;
(Continued)

(56) References Cited

U.S. PATENT DOCUMENTS 11,354,565 B2 6/2022 Johansen et al.
2018/0181868 A1 6/2018 Chew
(Continued)

FOREIGN PATENT DOCUMENTS

CN 110431566 A 11/2019
JP 2016146039 A 8/2016
(Continued)

OTHER PUBLICATIONS

Pagliari et al., NPL ("Optimal Input-Dependent Edge-Cloud Partitioning for RNN Inference" Published 2019—Total 4 Pages by IEEE (Year: 2019).*
(Continued)

*Primary Examiner* — Quoc A Tran

(57) ABSTRACT

A processing system performs using an edge device and a server device, wherein the edge device includes processing circuitry configured to process processing target data and output a processing result of the processing target data, determine that the server device is to execute processing related to the processing target data when an evaluation value for evaluating which of the edge device and the server device is to process the processing target data satisfies a condition, determine that the evaluation value is included in a range for determining that processing is to be executed by the edge device when the processing result of the processing target data satisfies a predetermined evaluation, and output the processing result of the processing target data processed, and transmit data that causes the server device to execute the
(Continued)

processing related to the processing target data when determining that the server device is to execute the processing.

11 Claims, 22 Drawing Sheets

(51) Int. Cl.

| | |
|---|---|
| ***G06N 3/0455*** | (2023.01) |
| ***G06N 3/08*** | (2023.01) |
| ***G06N 3/09*** | (2023.01) |
| ***G06N 3/096*** | (2023.01) |
| ***G06V 10/82*** | (2022.01) |
| ***G06V 10/94*** | (2022.01) |
| ***H04L 12/28*** | (2006.01) |
| ***H04L 41/14*** | (2022.01) |
| ***H04L 43/12*** | (2022.01) |
| ***H04L 67/1095*** | (2022.01) |
| ***H04L 67/12*** | (2022.01) |
| ***H04W 24/02*** | (2009.01) |

(52) U.S. Cl.
CPC ............. *G06N 3/0455* (2023.01); *G06N 3/08* (2013.01); *G06N 3/09* (2023.01); *G06N 3/096* (2023.01); *G06V 10/82* (2022.01); *G06V 10/95* (2022.01); *H04L 12/283* (2013.01); *H04L 41/14* (2013.01); *H04L 43/12* (2013.01); *H04L 67/1095* (2013.01); *H04L 67/12* (2013.01); *H04W 24/02* (2013.01)

(58) Field of Classification Search
CPC ........ H04L 43/12; G06N 3/0455; G06N 3/09; G06N 3/096; G06N 20/00; G06N 3/08; G06V 10/82; G06V 10/95; H04W 24/02; G06F 9/505; G06F 9/5088
See application file for complete search history.

(56) References Cited

U.S. PATENT DOCUMENTS

| | | | |
|---|---|---|---|
| 2018/0268287 | A1 | 9/2018 | Johansen et al. |
| 2019/0209022 | A1* | 7/2019 | Sobol ..................... A61B 5/681 |
| 2020/0082225 | A1* | 3/2020 | Watanabe ........... G06F 18/2185 |
| 2020/0127861 | A1 | 4/2020 | Doshi et al. |
| 2021/0192183 | A1* | 6/2021 | Hasegawa .............. G06N 20/00 |
| 2023/0224360 | A1 | 7/2023 | Kawashima et al. |

FOREIGN PATENT DOCUMENTS

| | | | |
|---|---|---|---|
| JP | 2020068473 | A | 4/2020 |
| JP | 2020511720 | A | 4/2020 |
| WO | 2020/081470 | A1 | 4/2020 |
| WO | 2020/082724 | A1 | 4/2020 |
| WO | 2021255803 | A1 | 12/2021 |

OTHER PUBLICATIONS

Teerapittayanon et al. (2017) "Distributed Deep Neural Networks Over the Cloud, the Edge and End Devices", Proceedings of the International Conference On Distributed Computing Systems, IEEE Computer Society, US, Jun. 5, 2017 (Jun. 5, 2017), pp. 328-339.
Okoshi et al. (2018) "Proposal and Evaluation of DNN Model Operation Scheme by Cloud-Edge Cooperation" 80th National Convention Lecture Proceedings in Information Processing Society of Japan, 2018 (1), 3-4, Mar. 13, 2018.
Enomoto et al. (2020) "Acceleration of Deep Learning Inference by Model Cascading" https://www.ieice.org/ken/paper/20200317h1WB/ https://ipsj.ixsq.nii.acjp/ej/?action=pages_view_main&active_action=repository_view_main_item_detail&item_id=204109&item_no=1&page_id=13&block_id=8.

* cited by examiner

Fig. 21

| DNN1、DNN2 | DETERMINATION UNIT | ENCODING UNIT, DECODING UNIT, COMMUNICATION CONTENT |
|---|---|---|
| (1-A) WHEN LOAD OF DNN1 IS LOW, INFERENCE IS PERFORMED TO END IN DNN1 AS MUCH AS POSSIBLE (WHEN HW RESOURCES ARE INSUFFICIENT, SENDING TO DNN2 IS PERFORMED AND REST IS EXECUTED IN DNN2) | (2-A) DATA IS SENT TO DNN2 IN PARALLEL WITH EXECUTION OF DNN1, AND WHEN LOAD IS NOT HEAVY, PARALLEL PROCESSING IS ALSO PERFORMED IN DNN2 | (3-A) ORIGINAL IMAGE OR PROCESSING RESULT OF DNN1 IN ADDITION TO ORIGINAL IMAGE IS TRANSMITTED AS IT IS |
| (1-B) ONE DNN IS DIVIDED AT SPECIFIC LAYER ACCORDING TO HW RESOURCES AND AMOUNT OF PROCESSING (INTO DNN1 AND DNN2), PROCESSING IS PERFORMED HALFWAY IN DNN1, AND REST IS EXECUTED IN DNN2<br>EXAMPLE: DIVISION POINT IS CHANGED AT ANY TIME ACCORDING TO LOAD, SUCH AS FIFTH LAYER AT LOAD PEAK AND TWELFTH LAYER AT NORMAL TIME | (2-B) DATA IS SENT TO DNN2 IN PARALLEL WITH EXECUTION OF DNN1, AND DNN2 PERFORMS PREFERENTIAL CONTROL AS LOW-PRIORITY REQUEST | (3-B) ONLY NECESSARY INFORMATION IS TRANSMITTED TO DNN2 ACCORDING TO RESULT OF DNN1 |
| (1-C) ONE DNN IS DIVIDED AT LAYER WITH LESS ENTROPY (INTO DNN1 AND DNN2), PROCESSING IS PERFORMED HALFWAY IN DNN1, AND REST IS EXECUTED IN DNN2 | (2-C) NECESSITY OF DNN2 PROCESSING IS DETERMINED BASED ON PROCESSING RESULT OF ENTIRE DNN1 OR INTERMEDIATE EXIT<br>EXAMPLE: "RELIABILITY" IS USED AS PROCESSING RESULT | (3-C) ONE DNN IS DIVIDED AT SPECIFIC LAYER (INTO DNN1 AND DNN2), AND ONLY FEATURE OF DIVIDED LAYER IS SENT |
| (1-D) ONLY LOW-LOAD INFERENCE IS PERFORMED IN DNN1, AND HIGH-LOAD AND HIGH-PRECISION DNN IS PERFORMED IN DNN2 | (2-D) INTERMEDIATE STATE OF DNN1 IS SENT TO DNN2 | (3-D-1) DIVIDED LAYER IS QUANTIZED AND SENT TO DNN2, AND PROCESSING CONTINUES WITH RETURNING TO ORIGINAL ACCURACY AFTER RECEPTION IN DNN2 |
| (1-E) NEXT REQUIRED DNN IS DETERMINED ACCORDING TO RESULT OF DNN1, AND SELECTED DNN2 IS EXECUTED | (2-E) DNN2 AS TRANSMISSION DESTINATION IS SELECTED BASED ON RESULT OF DNN1<br>EXAMPLE: OBJECT DETECTION AND PERSON DETECTION IN DNN1, SEX DETERMINATION AND VEHICLE DETECTION IN DNN2, AND NUMBER DETECTION IN DNN2 | (3-D-2) DIVIDED LAYER IS QUANTIZED AND SENT TO DNN2, AND PROCESSING CONTINUES WITHOUT RETURNING TO ORIGINAL ACCURACY |
| (1-F) PROCESSING IS PERFORMED IN DNN1 WHEN QUICK RESPONSE IS REQUIRED ACCORDING TO REQUIRED LATENCY, AND OTHERWISE, PROCESSING IS PERFORMED IN DNN2 BY BATCH WITH OTHER EDGES<br>EXAMPLE: EDGE DEVICE + SERVING | (2-F) DNN2 TO BE USED IS SELECTED ACCORDING TO SPATIAL DISTANCE TO DNN2 OR OPERATION/SYSTEM STATUS (FOR EXAMPLE, AVAILABILITY OF DNN2 AND AMOUNT OF WAITING TASKS)<br>EXAMPLE: SERVING | (3-D-3) DIVIDED LAYER IS QUANTIZED AND SENT TO DNN2, AND PROCESSING CONTINUES WITH ACCURACY RETURNED IN INTERMEDIATE LAYER IN DNN2 |
| (1-G) INTERMEDIATE EXIT IS INSERTED INTO DNN1 AND DNN2 SO THAT VARIOUS TASK DIFFICULTY LEVELS CAN BE HANDLED | (2-G) HIGHLY SPECIFIC (CONFIDENTIAL, PRIVATE, OR LIKE) INFORMATION IS PROCESSED BY DNN1, AND OTHER PROCESSED INFORMATION IS PROCESSED BY DNN2 | (3-E) ENCODING MEANS IS DESIGNED, WHICH IS OPTIMIZED FOR OUTPUT TENDENCY (ACQUIRED DURING TRAINING OF DNN1) OF EACH COMPONENT (NODE) OF FEATURE MAP TO BE TAKEN OVER TO DNN2 |
| (1-H) DNN1 PERFORMS TRAINING ENABLING ADVANCED ADAPTIVE SELECTION IN ADDITION TO NORMAL TRAINING | | (3-F) ENTIRE FEATURE MAP TAKEN OVER TO DNN2 IS SET AS ONE SPACE, AND ENCODING MEANS IS DESIGNED USING RESULT OF CLUSTERING EACH MAP IN THIS SPACE |

PROCESSING SYSTEM, AND PROCESSING METHOD

CROSS-REFERENCE TO RELATED APPLICATIONS

This application is a U.S. National Stage Application filed under 35 U.S.C. § 371 claiming priority to International Patent Application No. PCT/JP2020/023482, filed on 15 Jun. 2020, the disclosure of which is hereby incorporated herein by reference in its entirety.

TECHNICAL FIELD

The present disclosure relates to a processing system and a processing method.

BACKGROUND ART

Because an amount of data collected by Internet of Things (IOT) devices represented by sensors is large, an enormous amount of communication is generated when the collected data is aggregated and processed by cloud computing. For this reason, attention is being focused on edge computing for processing collected data in edge devices close to users.

However, resources such as an amount of computation or a memory used in the edge device are poor as compared with a device (hereinafter, described as a cloud for convenience) other than the edge device, which is physically and logically disposed farther from a user than the edge device. For this reason, when processing with a large computation load is performed by the edge device, it may take a large amount of time to complete the processing or to complete other processing with a smaller amount of computation.

Here, one of processing with a large amount of computation may be processing related to machine training. non-patent literature (NPL) 1 proposes application of so-called adaptive training to an edge cloud. That is, in a method described in NPL 1, a trained model trained using general-purpose training data in a cloud is developed in an edge device, and training is performed again on the model trained in the cloud using data acquired by the edge device, thereby achieving an operation taking advantage of the cloud and the edge device.

CITATION LIST

Patent Literature

[NPL 1] Ogoshi et al., "Proposal and Evaluation of DNN Model Operation Scheme by Cloud-Edge Cooperation", 80th National Convention Lecture Proceedings in Information Processing Society of Japan, 2018 (1), 3-4, 2018 Mar. 13.

SUMMARY OF THE INVENTION

Technical Problem

However, the method described in NPL 1 has not been examined for inference processing. In inference, an amount of computation becomes larger when data that is a processing target, that is, an inference target becomes more complicated and when a problem to be solved becomes more difficult. It is assumed that such processing with a large amount of computation is preferably processed in a cloud. However, to determine processing with a large amount of computation to be performed in the cloud, the edge device determines the complexity of inference target data and the difficulty of the problem to be solved.

Further, there are inference accuracy and a response required by the user as a viewpoint different from the difficulty of the problem to be solved. That is, the user may require an immediate response even though the inference accuracy is not very high, or may require a high inference accuracy even though the response is slow. However, NPL 1 does not describe a method in which an edge device determines processing having a large amount of computation of processing to be performed in a cloud while considering the inference accuracy and the response required by the user.

The present disclosure has been made in view of the above, and an object of the present disclosure is to provide a processing system and a processing method capable of controlling execution of processing in cooperation with an edge device and a cloud according to a request of a user.

Means for Solving the Problem

To solve the above-described problems and achieve the object, a processing system according to the present disclosure is a processing system performed using an edge device and a server device, wherein the edge device includes processing circuitry configured to: process processing target data and output a processing result of the processing target data; determine that the server device is to execute processing related to the processing target data when an evaluation value for evaluating which of the edge device and the server device is to process the processing target data satisfies a condition, determine that the evaluation value is included in a range for determining that processing is to be executed by the edge device when the processing result of the processing target data satisfies a predetermined evaluation, and output the processing result of the processing target data processed; and transmit data that causes the server device to execute the processing related to the processing target data when determining that the server device is to execute the processing related to the processing target data.

Further, a processing method according to the present disclosure is a processing method executed by a processing system performed using an edge device and a server device, the processing method including: by the edge device, processing processing target data and outputting a processing result of the processing target data; by the edge device, determining that the server device is to execute processing related to the processing target data when an evaluation value for evaluating which of the edge device and the server device is to process the processing target data satisfies a condition, determining that the evaluation value is included in a range for determining that processing is to be executed by the edge device when the processing result of the processing target data satisfies a predetermined evaluation, and outputting the processing result of the processing target data processed in the processing, by processing circuitry; and by the edge device, transmitting data that causes the server device to execute the processing related to the processing target data when it is determined in the determining that the server device is to execute the processing related to the processing target data.

Effects of the Invention

According to the present disclosure, it is possible to control execution of processing in cooperation with an edge device and a cloud according to a request of a user, and to efficiently operate an entire system including the device and the cloud.

BRIEF DESCRIPTION OF DRAWINGS

FIG. 21 is a diagram illustrating variations in functions of a DNN, a determination unit, an encoding unit, and a decoding unit, and variations in communication content.

DETAILED DESCRIPTION OF THE INVENTION

Hereinafter, embodiments of the present disclosure will be described in detail with reference to the drawings. The present disclosure is not limited to these embodiments. Further, in description of the drawings, the same units are denoted by the same reference signs.

Embodiment 1

Overview of Embodiment 1

Embodiments of the present disclosure will be described. In Embodiment 1 of the present disclosure, a processing system that uses a trained high-precision model and a trained lightweight model to perform inference processing will be described. A case in which a deep neural network (DNN) is used as a model that is used for the inference processing in the processing system of the embodiment will be described by way of example. In the processing system of the embodiment, a neural network other than a DNN may be used, or signal processing with a small amount of computation and signal processing with a large amount of computation may be used instead of a trained model.

Figure 1:
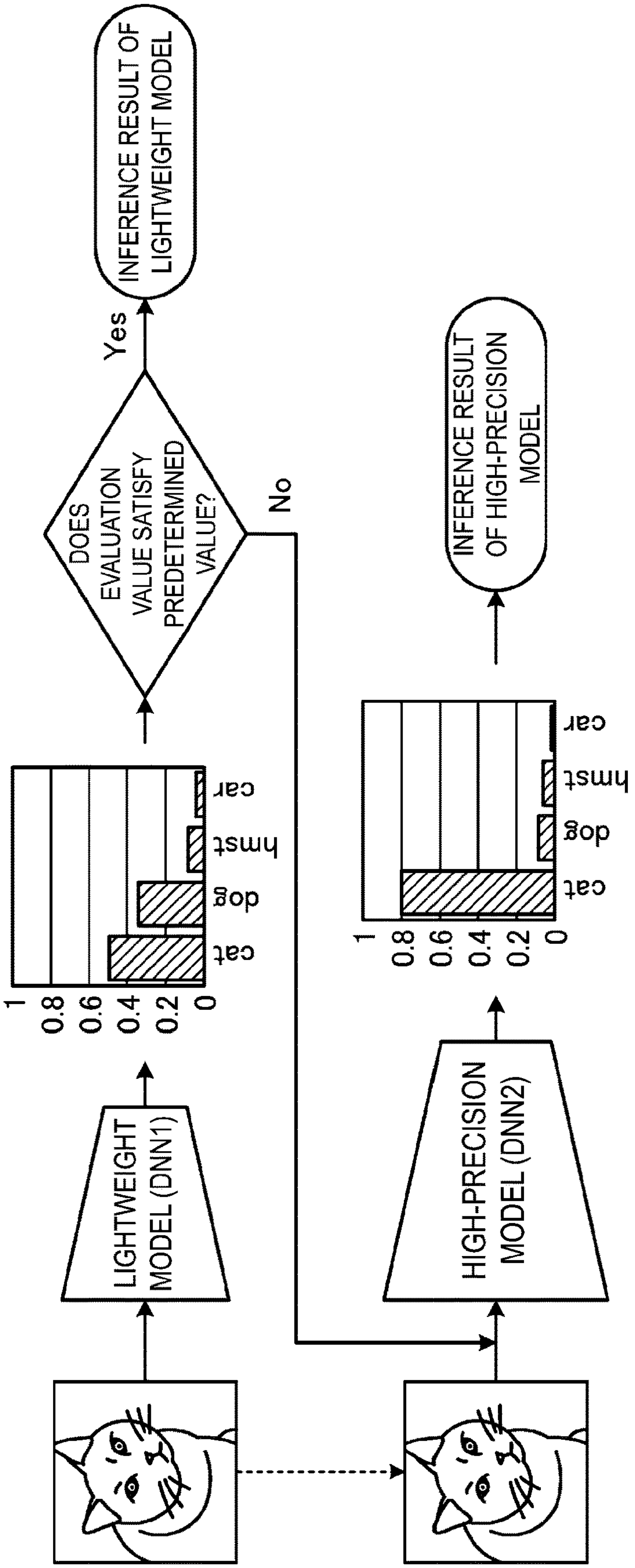
FIG. 1 is a diagram illustrating an overview of a processing method for a processing system according to Embodiment 1.

FIG. 1 is a diagram illustrating an overview of a processing method for the processing system according to Embodiment 1. In the processing system of Embodiment 1, the high-precision model and the lightweight model constitute a model cascade. The processing system of Embodiment 1 controls which of an edge device using a high-speed and low-precision lightweight model (for example, DNN1) and a cloud (server device) using a low-speed and high-precision model (for example, DNN2) executes processing, by using an evaluation value. For example, the server device is disposed at a place physically and logically far from a user. The edge device is an IoT device or any of various terminal devices disposed at a place physically and logically close to the user, and has less resources than the server device.

DNN1 and DNN2 are models that output inference results based on input data. In the example of FIG. 1, DNN1 and DNN2 receive an image and infer a probability of an object appearing in the image for each class. The two images illustrated in FIG. 1 are the same. For example, DNN1 is trained, considering which of the models DNN1 and DNN2 makes a larger profit requested by the user by performing inference. DNN1 and DNN2 are optimized so that an optimum evaluation value is obtained.

Examples of the request of the user include high precision of an inference result, reduction of an amount of data communication, high speed of calculation processing, and resource optimization of the edge device. The evaluation value is a value for evaluating which of the edge device and the server device is to process processing target data while satisfying the request of the user. The evaluation value has a stronger tendency to fall in a range for determining that evaluation is to be executed by the server device when the processing for the processing target data becomes more difficult.

As illustrated in FIG. 1, the processing system acquires an evaluation value for inference of class classification of DNN1 for an object appearing in an input image. In the processing system, when the acquired evaluation value satisfies a predetermined condition such as a predetermined value, an inference result of DNN1 is adopted. That is, an inference result of the lightweight model is output as a final estimation result of the model cascade. On the other hand, in the processing system, when the evaluation value does not satisfy the predetermined value, an inference result obtained by inputting the same image to DNN2 is output as a final inference result. Satisfying the predetermined value includes, for example, whether a condition based on a predetermined threshold value is satisfied or whether the evaluation value is included in a predetermined range.

Thus, the processing system according to Embodiment 1 selects the edge device or the server device based on the evaluation value for evaluating which of the edge device and the server device is to process the processing target data according to the request of the user, and processes the processing target data. Thus, the processing system according to Embodiment 1 can control which of the edge device and the cloud executes the processing according to the request of the user.

Lightweight Model and High-Precision Model

Figure 2:
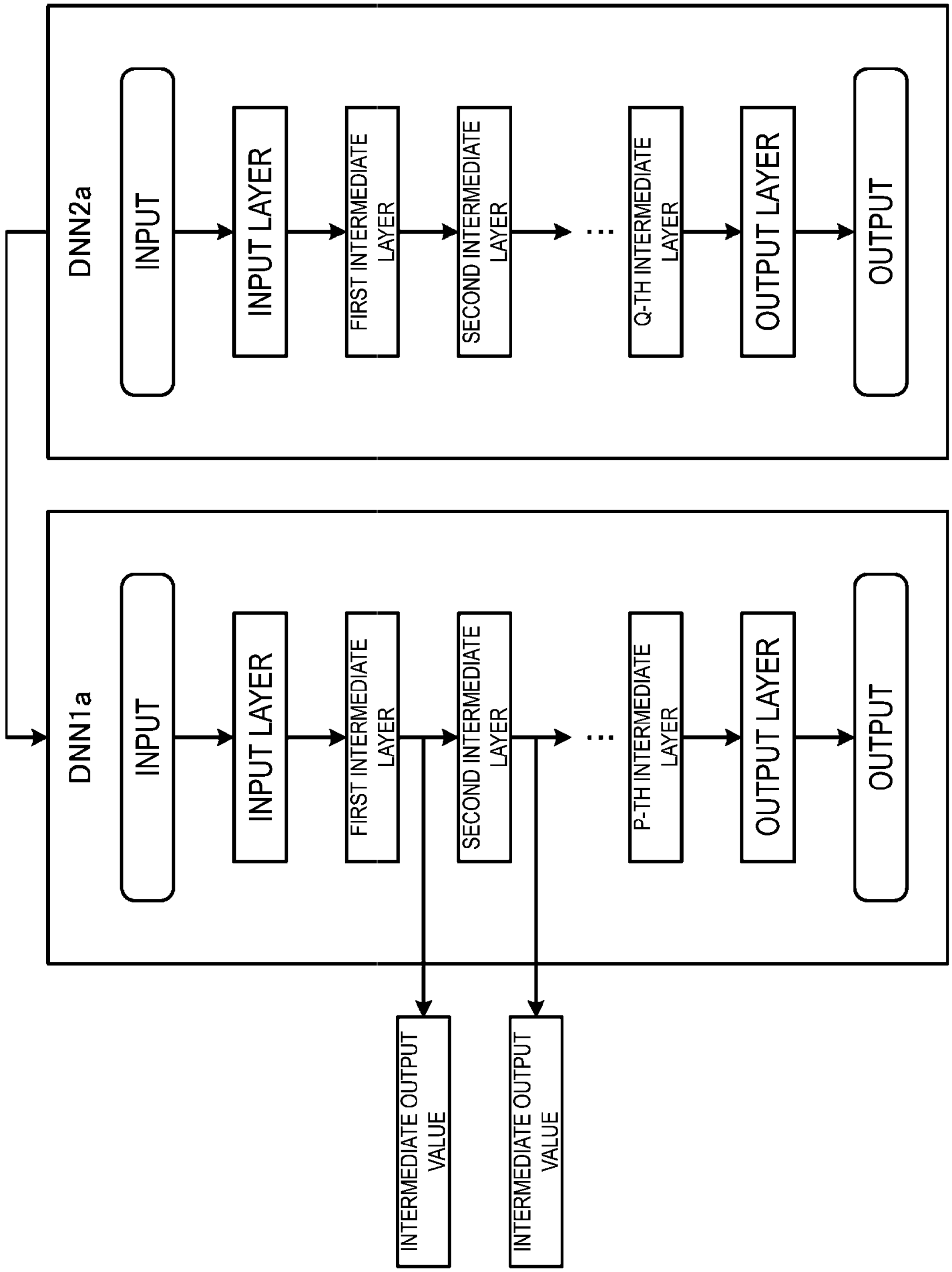
FIG. 2 is a diagram illustrating an example of DNN1 and DNN2.
Figure 3:
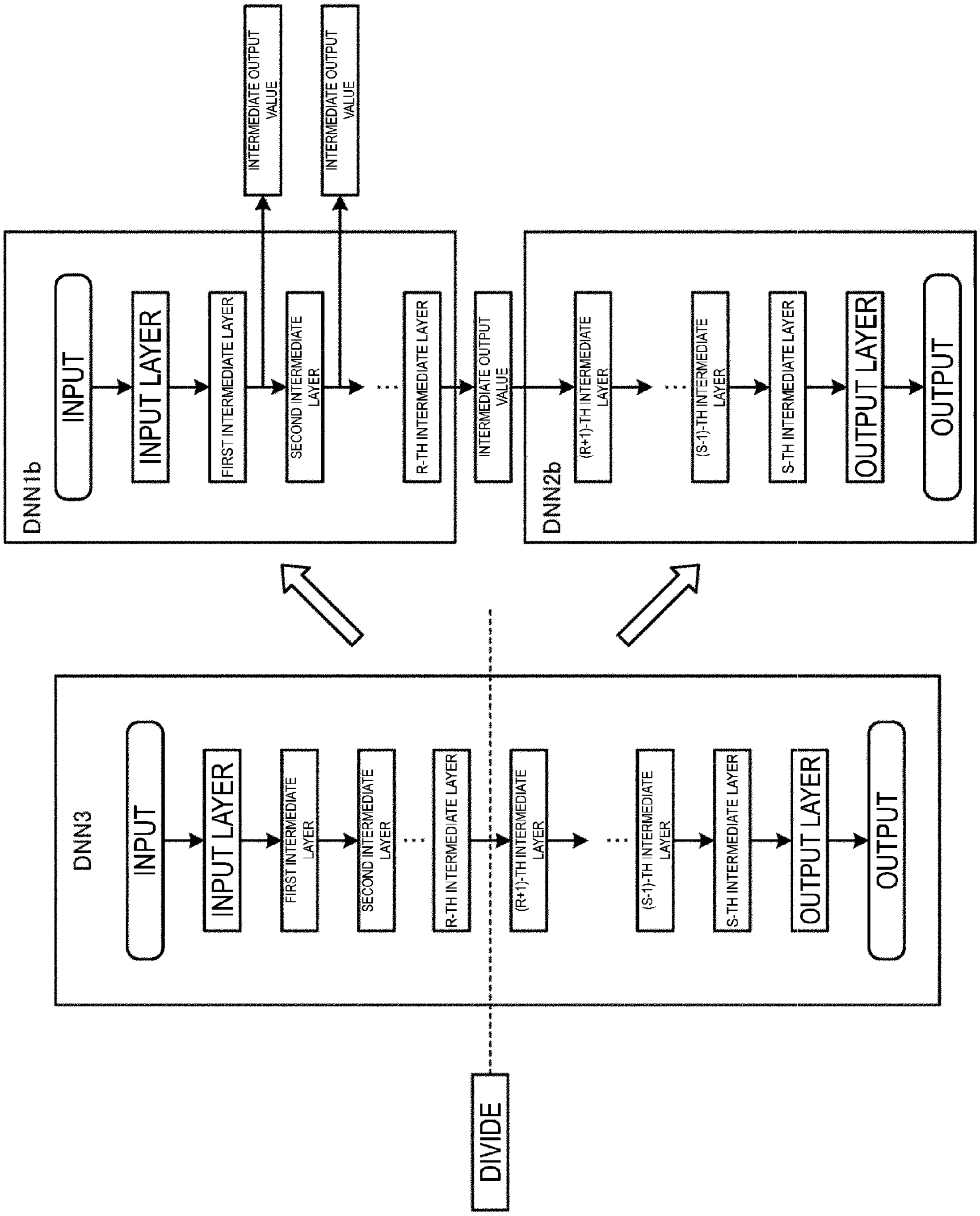
FIG. 3 is a diagram illustrating an example of DNN1 and DNN2.

Next, DNN1 and DNN2 will be described. FIGS. 2 and 3 are diagrams illustrating an example of DNN1 and DNN2. The DNN includes an input layer to which data is input, one or a plurality of intermediate layers that variously convert data input from the input layer, and an output layer that outputs a so-called inference result such as a probability, a likelihood, or the like. An output value output from each layer may be irreversible when input data needs to maintain anonymity.

As illustrated in FIG. 2, the processing system may use independent deep neural network (DNN) 1*a* and DNN2a. For example, after DNN2a is trained in a known method, DNN1a is trained, considering which of the models DNN1a and DNN2a makes a larger profit requested by the user by performing inference. DNN1a is trained to output a value regarding the evaluation value. DNN1a outputs an intermediate output value that is an output value of an intermediate layer of DNN1a as the value regarding the evaluation value. The evaluation value may be a value calculated based on the intermediate output value, or may be the intermediate output value itself. The used intermediate output value may be a result obtained by inputting an intermediate output value of a predetermined intermediate layer into a cost function capable of performing training more suitable to meet the request of the user, such as a correlation between the intermediate output value and a likelihood, or an output of any intermediate layer of a trained model designed with only the problem to be solved as a cost function. This is because, for example, when a network (such as convolutional neural network (CNN)) tending to have properties such that characteristics determining input data are reflected in a higher-order intermediate layer is used, useful characteristics that can be used for the problem to be solved are extracted in an output value of the higher-order intermediate layer. The same tasks with different accuracy and performance may be assigned to DNN1a and DNN2a, or different tasks may be assigned to DNN1a and DNN2a.

Further, as illustrated in FIG. 3, the processing system divides DNN3 trained as an integrated DNN into DNN1b and DNN2b at a point between an R layer and a (R+1)-th layer using a predetermined reference. The processing system may apply DNN1b in a front stage to the edge device and DNN1b in a rear stage to the server device. In this case, DNN1b outputs an intermediate output value from an R-th intermediate layer as the evaluation value. The DNN1b may output an intermediate output value from a layer before the R-th intermediate layer as the evaluation value.

Further, the evaluation value is not limited to the intermediate output value output from DNN1a or DNN1b. For example, the evaluation value may be an inference error output from DNN1a, or may be a value based on the inference error. For example, the evaluation value may be a value indicating a degree of certainty as to whether a result of processing in the edge device is a correct answer. The evaluation value may be a value that is determined based on any one of a time for obtaining a processing result of the processing target data, an acquisition deadline of the processing result of the processing target data, a use situation of resources of the edge device when it is determined which of the edge device and the server device is to process the processing target data, and whether the processing target data is data in which an event occurs as compared with other data. The use situation of the resources of the edge device may be a usage rate of a central processing unit (CPU) or a memory of the edge device alone, an amount of power consumption, or the like, or may be a difference in an operating amount or a resource usage rate between the edge device and other edge device, or the like. Further, the event means, for example, a case in which a target frame has a change equal to or larger than a desired size as compared with a previous frame, or a case in which a target to be finely estimated occurs. Further, a target on which the edge device has performed computation, and data indicating a result may be transmitted to the server device, and the server device may be designed to perform computation on only a target on which the edge device has not performed the computation. Specifically, a coordinate value of a bounding box or a class classification result and the reliability thereof may be sent together, and only a target that does not satisfy the reliability may be computed in the server device.

Processing System

Figure 4:
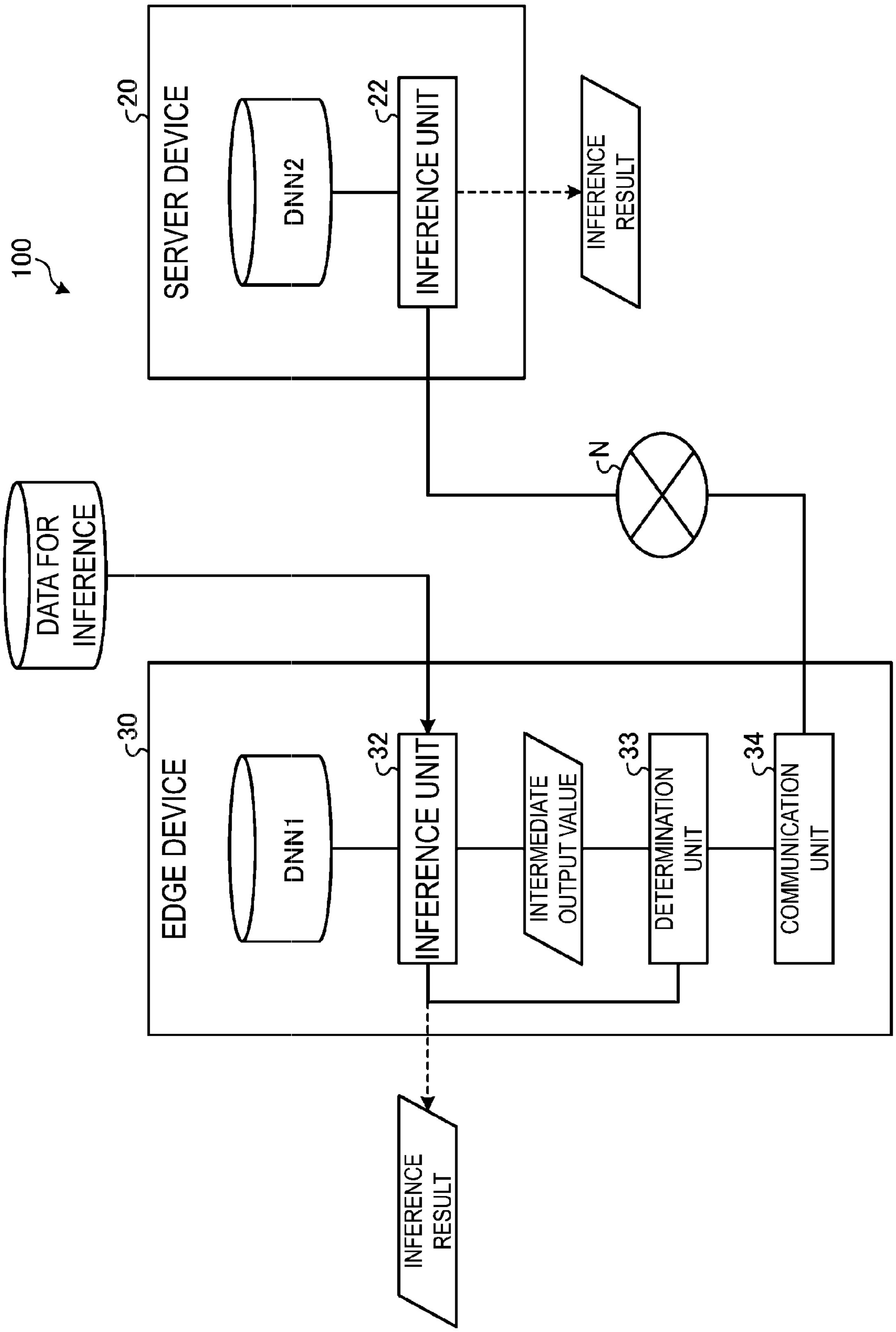
FIG. 4 is a diagram schematically illustrating an example of a configuration of the processing system according to Embodiment 1.

Next, a configuration of the processing system will be described. FIG. 4 is a diagram schematically illustrating an example of a configuration of the processing system according to Embodiment 1.

A processing system 100 according to the embodiment includes a server device 20 and an edge device 30. Further, the server device 20 and the edge device 30 are connected via a network N. The network N is, for example, the Internet. In this case, the server device 20 may be a server provided in a cloud environment. Further, the edge device 30 may be an IoT device or any of various terminal devices.

The server device 20 and the edge device 30 are achieved by a predetermined program being read into a computer including a read only memory (ROM), a random access memory (RAM), a central processing unit (CPU), and the like and the CPU executing the predetermined program. Further, a so-called accelerator represented by a GPU, a vision processing unit (VPU), a field programmable gate array (FPGA), an application specific integrated circuit (ASIC), or a dedicated artificial intelligence (AI) chip is also used. Each of the server device 20 and the edge device 30 includes a network interface card (NIC) or the like, and can perform communication with other devices via a telecommunication line such as a local area network (LAN) or the Internet.

As illustrated in FIG. 4, the server device 20 stores DNN2 that is a trained high-precision model. DNN2 includes information such as model parameters. Further, the server device 20 includes an inference unit 22.

The inference unit 22 inputs data for inference (the processing target data) to DNN2 and acquires an inference result (processing result). The inference unit 22 receives an input of the data for inference and outputs the inference result. It is assumed that the data for inference is data with an unknown label. For example, the data for inference is an image. When the inference result is returned to the user, the inference result obtained by the inference unit 22 may be transferred to the edge device and returned from the edge device to the user.

Here, the server device 20 and the edge device 30 form a model cascade. Thus, the inference unit 22 does not always perform inference for the data for inference. The inference unit 22 performs inference using DNN2 when it is determined that the server device 20 is to execute the inference processing related to the data for inference.

The edge device 30 stores DNN1 that is a trained lightweight model. DNN1 includes information such as model parameters. DNN1 is trained, considering which of the models DNN1 and DNN2 makes a larger profit requested by the user by performing inference. A parameter learned in advance so that the model cascade including DNN1 and DNN2 is optimized, considering whether the profit requested by the user is large, is set in DNN1. Further, the edge device 30 includes an inference unit 32 (edge processing unit), a determination unit 33, and a communication unit 34 (transmission unit).

The inference unit 32 inputs data for inference (the processing target data) to DNN1 and acquires an inference result. The inference unit 32 receives an input of the data for inference, processes the data for inference, and outputs the inference result (the processing result of the processing target data).

The determination unit 33 determines whether an evaluation value for evaluating which of the edge device 30 and the server device 20 is to process the data for inference, which is designed to reflect a request of a user, satisfies a predetermined value.

The determination unit 33 determines that an inference result for data for inference satisfies a predetermined evaluation when the evaluation value satisfies the predetermined value, determines that the evaluation value is included in a range for determining that processing is to be executed by the edge device 30, and outputs an inference result of the inference unit 32. When the evaluation value does not satisfy the predetermined value, the determination unit 33 determines that the evaluation value is included in a range for determining that evaluation is to be executed by the server device 20, and determines that the server device 20 is to execute processing related to the data for inference (the inference processing). The evaluation value is an intermediate output value, an inference error, a degree of certainty, or the like, as described above. Further, the determination unit 33 may narrow down the data for processing that is a transmission target. For example, the determination unit 33 narrows down the data for processing to data of a node necessary for processing of DNN2. A criterion for narrowing down when the data for inference is an image is illustrated herein. When an event has occurred in a part of the image, the determination unit 33 performs narrowing-down to such a part or an area required for estimation related to the event. Further, when the determination unit 33 determines whether the processing is to be performed on each area of the image by the edge device or the server device, the determination unit 33 may perform narrowing-down to an area on which the server device is to perform the processing. Although the narrowing-down from the spatial viewpoint has been illustrated, the determination unit 33 may perform the narrowing-down from the temporal viewpoint.

The communication unit 34 performs communication with another device (for example, the server device 20) via the network N. When the determination unit 33 determines that the server device 20 is to execute the inference processing related to the data for inference, the communication unit 34 transmits data for processing for causing the server device 20 to execute the inference processing to the server device 20. When the evaluation value is the intermediate output value, the communication unit 34 transmits the intermediate output value to the server device 20.

Processing Procedure of Processing System

Figure 5:
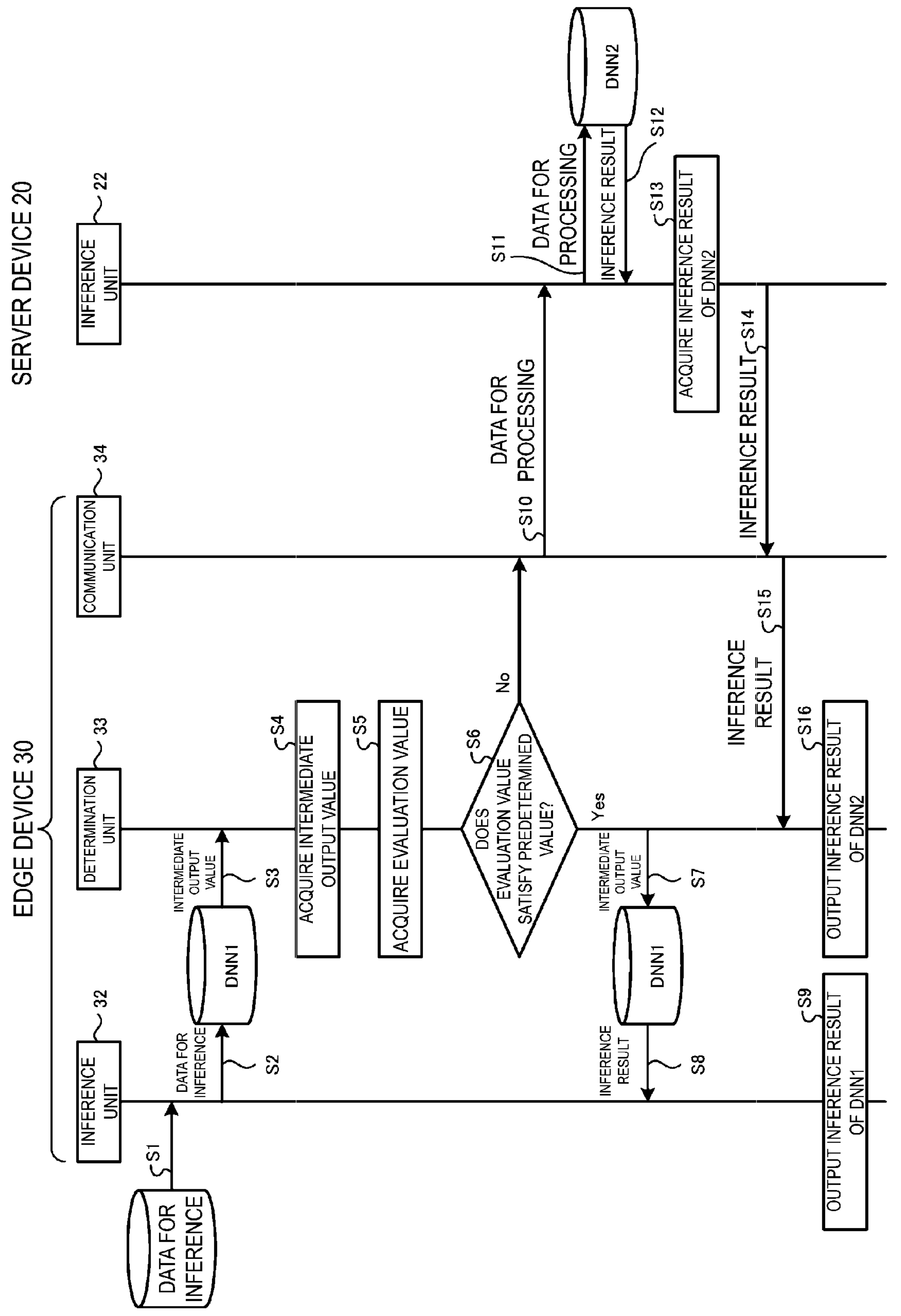
FIG. 5 is a sequence diagram illustrating processing of the processing system according to Embodiment 1.

FIG. 5 is a sequence diagram illustrating processing of the processing system according to Embodiment 1. As illustrated in FIG. 5, first, in the edge device 30, when the inference unit 32 receives an input of the data for inference (step S1), the inference unit 32 inputs the data for inference to DNN1 (step S2).

The determination unit 33 acquires the intermediate output value of DNN1 (steps S3 and S4) and acquires the evaluation value (step S5). The determination unit 33 determines whether the evaluation value satisfies a predetermined value (step S6).

When the evaluation value satisfies the predetermined value (step S6: Yes), the determination unit 33 inputs the intermediate output value to an intermediate layer next to a layer that has output the intermediate output value among the intermediate layers of DNN1 (step S7). The inference unit 32 acquires the inference result of DNN1 (step S8) and outputs the acquired inference result of DNN1 (step S9).

On the other hand, when the evaluation value does not satisfy the predetermined value (step S6: No), the determination unit 33 transmits the data for processing for causing the server device 20 to execute the inference processing to the server device 20 via the communication unit 34 (steps S10 and S11). For example, the data for processing is the data for inference, and a degree of certainty of DNN1. Alternatively, the data for processing is the intermediate output value.

In the server device 20, the inference unit 22 inputs the data for processing to DNN2 (step S11) and acquires an inference result of DNN2 (steps S12 and S13). The inference result of DNN2 is transmitted to the edge device 30 (steps S14 and S15) and output from the edge device 30 (step S16). Although, in the present embodiment, it is assumed that the inference result is returned to the user, and the final inference result is output from the edge device 30, the inference result of DNN2 may be output from the server device 20 or held in the server device 20 as it is in a case in which the final inference result is used by the server device 20. When the inference result of DNN1 is to be used by the server device 20, the edge device 30 may transmit the inference result to the server device 20.

Effects of Embodiment 1

Thus, according to Embodiment 1, the edge device or the server device is selected based on the evaluation value for evaluating which of the edge device and the server device is to process the processing target data according to the request of the user, and the processing target data is processed. Thus, the processing system according to Embodiment 1 can control which of the edge device and the cloud executes the processing according to the request of the user.

Although, in Embodiment 1, a case in which the single edge device 30 and the single server device 20 are provided has been described, there may be a plurality of the edge devices 30 or a plurality of the server devices 20 or there may be the plurality of edge devices 30 and the plurality of server devices 20.

Application Example

An example in which Embodiment 1 is applied to a request for high accuracy of the inference result and the degree of certainty is adopted as the evaluation value will be described. First, training of the lightweight model and the high-precision model for achieving high-precision inference results will be described.

Figure 6:
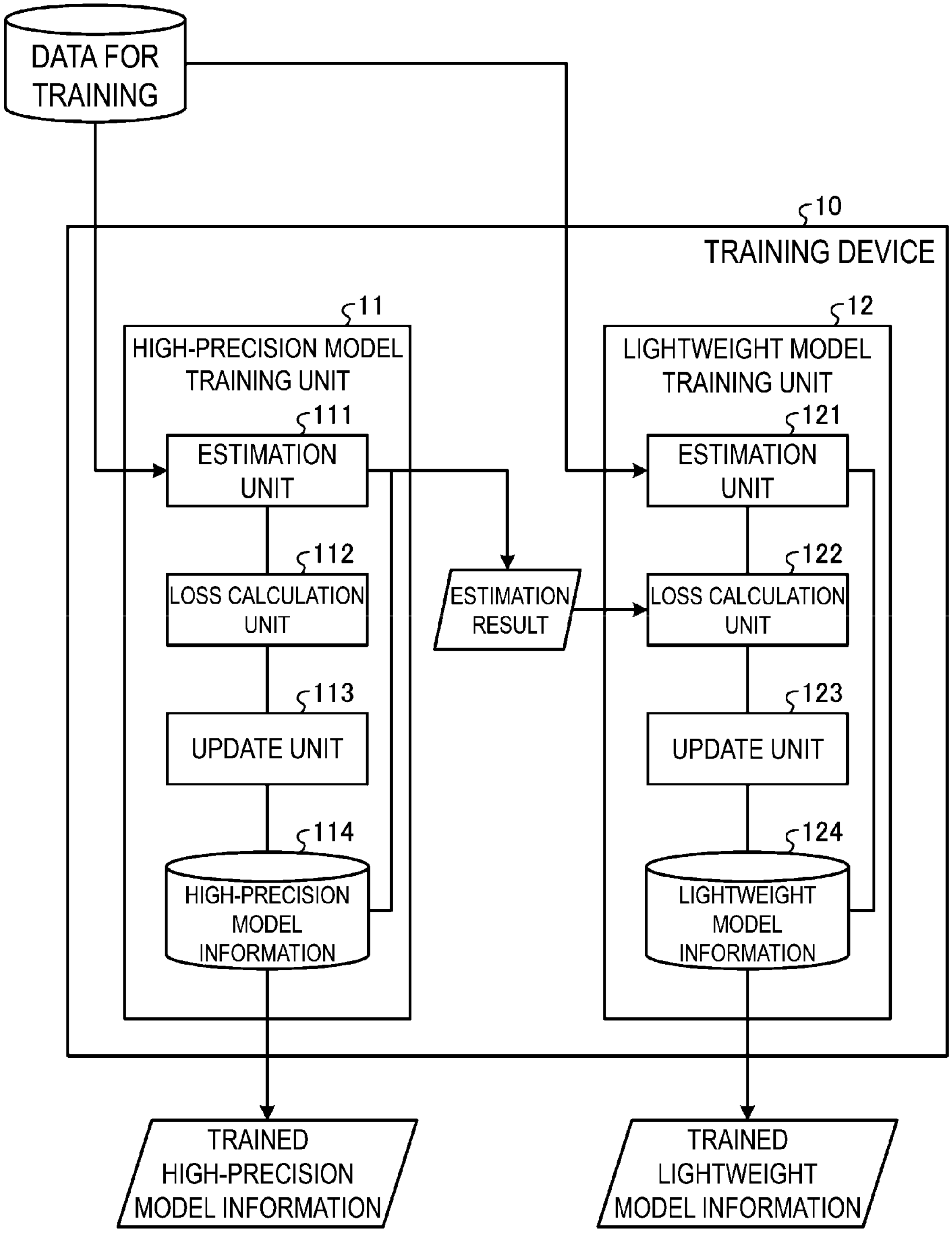
FIG. 6 is a diagram illustrating a configuration example of a training device for training a lightweight model and a high-precision model.

FIG. 6 is a diagram illustrating a configuration example of a training device for training the lightweight model and the high-precision model. As illustrated in FIG. 2, a training device 10 receives an input of data for training and outputs trained high-precision model information and trained lightweight model information. Further, the training device 10 includes a high-precision model training unit 11 and a lightweight model training unit 12.

The high-precision model training unit 11 includes an estimation unit 111, a loss calculation unit 112, and an update unit 113. Further, the high-precision model training unit 11 stores high-precision model information 114. The high-precision model information 114 is information such as parameters for constructing a high-precision model. It is assumed that the data for training is data with a known label. For example, the data for training is a combination of an image and a label (correct class).

The estimation unit 111 inputs data for training to the high-precision model constructed based on the high-precision model information 114, and acquires an estimation result. The estimation unit 111 receives an input of the data for training and outputs the estimation result.

The loss calculation unit 112 calculates a loss based on the estimation result acquired by the estimation unit 111. The loss calculation unit 112 receives an input of the estimation result and the label, and outputs the loss. For example, the loss calculation unit 112 calculates a loss that becomes high when the degree of certainty of the label is lower in the estimation result acquired by the estimation unit 111. For example, the degree of certainty is a degree of certainty that the estimation result is a correct answer. For example, the degree of certainty may be a probability output by the multiclass classification model described above. Specifically, the loss calculation unit 112 can calculate a softmax cross entropy to be described below as a loss.

The update unit 113 updates parameters of the high-precision model so that the loss is optimized. For example, when the high-precision model is a neural network, the update unit 113 updates the parameters of the high-precision model using an error backpropagation method or the like. Specifically, the update unit 113 updates the high-precision model information 114. The update unit 113 receives an input of the loss calculated by the loss calculation unit 112, and outputs information on the updated model.

The lightweight model training unit 12 includes an estimation unit 121, a loss calculation unit 122, and an update unit 123. Further, the lightweight model training unit 12 stores lightweight model information 124. The lightweight model information 124 is information such as parameters for constructing the lightweight model.

The estimation unit 121 inputs the data for training to the lightweight model constructed based on the lightweight model information 124, and acquires an estimation result. The estimation unit 121 receives an input of the data for training and outputs the estimation result.

Here, the high-precision model training unit 11 trains the high-precision model based on an output of the high-precision model. On the other hand, the lightweight model training unit 12 trains the lightweight model based on the outputs of both the high-precision model and the lightweight model.

The loss calculation unit 122 calculates the loss based on the estimation result acquired by the estimation unit. The loss calculation unit 122 receives inputs of an estimation result by the high-precision model, an estimation result by the lightweight model, and the label, and outputs the loss. The estimation result by the high-precision model may be an estimation result obtained by further inputting the data for training to the high-precision model after training has been performed by the high-precision model training unit 11. More specifically, the lightweight model training unit 12 receives an input indicating whether the estimation result by the high-precision model is a correct answer. For example, when a class with the highest probability output by the high-precision model matches the label, the estimation result is a correct answer.

The loss calculation unit 122 calculates the loss for the purpose of maximizing a profit in a case in which the model cascade is configured, in addition to maximizing estimation accuracy of the lightweight model alone. Here, it is assumed that the profit becomes larger when the estimation accuracy is higher, and becomes larger as the calculation cost is lower.

For example, the high-precision model is characterized by high estimation accuracy but a large calculation cost. Further, for example, the lightweight model is characterized by low estimation accuracy but a small calculation cost. Thus, the loss calculation unit 122 calculates a Loss, as in Equation (1). Here, w is a weight and is a preset parameter.

$$\text{Loss}=L_{classifier}+wL_{cascade} \quad \text{[Math. 1]}$$

Here, $L_{classifier}$ is a softmax entropy in a multiclass classification model. Further, $L_{classifier}$ is an example of a first term that becomes larger when the degree of certainty of the correct answer in the estimation result by the lightweight model is lower. $L_{classifier}$ is expressed as in Equation (2). Here, N is the number of samples. Further, k is the number of classes. Further, y is a label indicating a class of a correct answer. Further, q is a probability output by the lightweight model. i is a number for identifying a sample. Further, j is a number for identifying a class. A label $y_{i,j}$ becomes 1 when a j-th class is a correct answer and 0 when the j-th class is an incorrect answer in an i-th sample.

[Math. 2]

$$L_{classifier} = \frac{1}{N}\sum_{i=1}^{N}\left\{-\sum_{j=1}^{K} y_{i,j}\log q_{i,j}\right\} \tag{2}$$

Further, $L_{cascade}$ is a term for maximizing a profit in a case in which a model cascade is configured. $L_{cascade}$ indicates a loss in a case in which the estimation results of the high-precision model and the lightweight model have been adopted based on the degree of certainty of the lightweight model with respect to each sample. Here, the loss includes a penalty for improper degree of certainty and a cost of use of a high-precision model. Further, the loss is divided into four patterns according to a combination of whether an estimation result of the high-precision model is a correct answer and whether an estimation result of the lightweight model is a correct answer. Details thereof will be described below, but when the estimation of the high-precision model is an incorrect answer and the degree of certainty of the lightweight model is low, the penalty becomes larger. On the other hand, when the estimation of the lightweight model is a correct answer and the degree of certainty of the lightweight model is high, the penalty is small. $L_{cascade}$ is expressed by Equation (3).

[Math. 3]

$$L_{cascade} = \frac{1}{N}\sum_{i=1}^{N}\left\{\max_j q_{i,j} 1_{fast} + \left(1-\max_j q_{i,j}\right)1_{acc} + \left(1-\max_j q_{i,j}\right)\mathrm{COST}_{acc}\right\} \quad (3)$$

$1_{fast}$ is an indicator function of returning 0 when the estimation result of the lightweight model is a correct answer and 1 when the estimation result of the lightweight model is an incorrect answer. $1_{acc}$ is an indicator function of returning 0 when the estimation result of the high-precision model is a correct answer and 1 when the estimation result of the high-precision model is an incorrect answer. $\mathrm{COST}_{acc}$ is a cost for estimation in the high-precision model and is a parameter that is set in advance.

Further, $\max_j q_{i,j}$ is a maximum value of a probability that is output by the lightweight model and is an example of the degree of certainty. When the estimation result is a correct answer, it can be said that the estimation accuracy is higher when the degree of certainty is higher. On the other hand, when the estimation result is an incorrect answer, it can be said the estimation accuracy is lower when the degree of certainty is higher.

In Equation (3), $\max_j q_{i,j} 1_{fast}$ is an example of a second term that becomes larger when the degree of certainty of the estimation result by the lightweight model is higher in a case in which the estimation result by the lightweight model is an incorrect answer. Further, $(1-\max_j q_{i,j})1_{acc}$ in Equation (3) is an example of a third term that becomes larger when the degree of certainty of the estimation result by the lightweight model becomes lower in a case in which the estimation result by the high-precision model is an incorrect answer. Further, $(1-\max_j q_{i,j})\mathrm{COST}_{acc}$ in Equation (3) is an example of a fourth term that becomes larger when the degree of certainty of the estimation result by the lightweight model becomes lower. In this case, the minimization of the loss by the update unit 123 corresponds to the optimization of the loss.

The update unit 123 updates parameters of the lightweight model so that the loss is optimized. That is, the update unit 123 updates the parameters of the lightweight model so that the model cascade including the lightweight model and the high-precision model is optimized, based on the estimation result by the lightweight model, and an estimation result obtained by inputting data for training to a high-precision model having a lower processing speed and a higher estimation accuracy than the lightweight model, which is a model that outputs an estimation result based on input data. The update unit 123 receives an input of the loss calculated by the loss calculation unit 122, and outputs information on the updated model.

Figure 7:
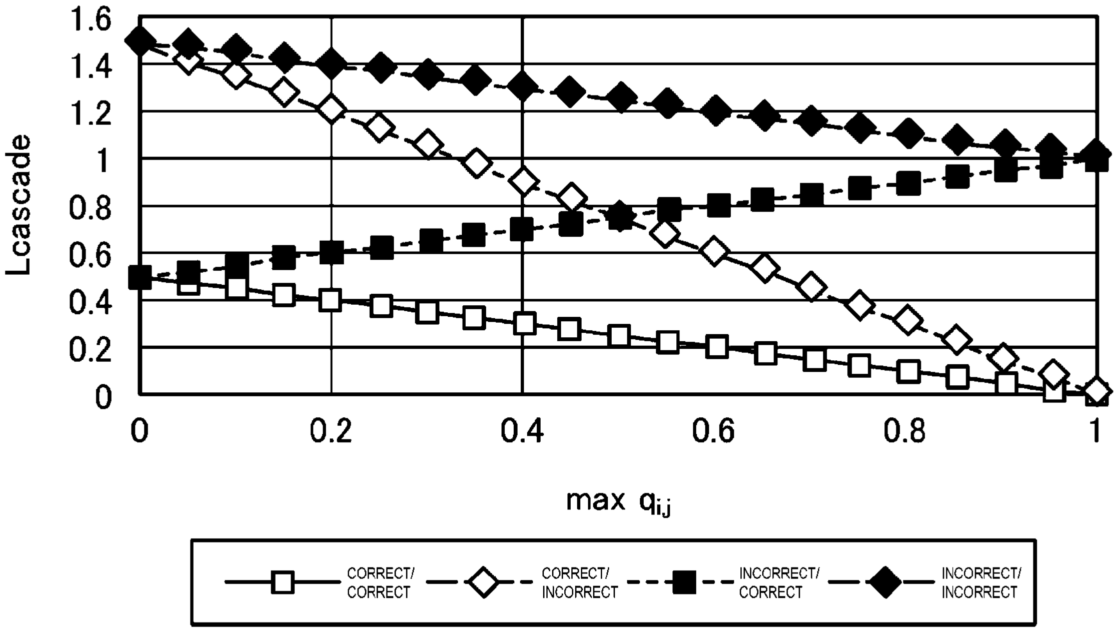
FIG. 7 is a diagram illustrating an example of loss for each case.

FIG. 7 is a diagram illustrating an example of the loss for each case. A vertical axis is a value of $L_{cascade}$. A horizontal axis is the value of $\max_j q_{i,j}$. Further, $\mathrm{COST}_{acc}$=0.5. $\max_j q_{i,j}$ is degree of certainty of the estimation result by the lightweight model, and is simply called degree of certainty herein.

"□" in FIG. 7 is a value of $L_{cascade}$ for the degree of certainty when estimation results of both the lightweight model and the high-precision model are correct answers. In this case, the value of $L_{cascade}$ becomes smaller when the degree of certainty is higher. This is because, in a case in which the estimation result by the lightweight model is a correct answer, the lightweight model is more likely to be adopted when the degree of certainty is higher.

"◇" in FIG. 7 is a value of $L_{cascade}$ for the degree of certainty when the estimation result of the lightweight model is a correct answer and the estimation result of the high-precision model is an incorrect answer. In this case, the value of $L_{cascade}$ becomes smaller when the degree of certainty is higher. Further, a maximum value and a degree of $L_{cascade}$ being smaller are larger than in the case of "□" This is because, in a case in which the estimation result by the high-precision model is an incorrect answer and the estimation result by the lightweight model is a correct answer, a tendency that the lightweight model is more likely to be adopted when the degree of certainty is higher increases.

A black square in FIG. 7 is a value of $L_{cascade}$ for the degree of certainty in a case in which the estimation result of the lightweight model is an incorrect answer and the estimation result of the high-precision model is a correct answer. In this case, the value of $L_{cascade}$ becomes larger when the degree of certainty is higher. This is because, in a case in which the estimation result of the lightweight model is an incorrect answer, the estimation result is less likely to be adopted when the degree of certainty is lower.

"♦" in FIG. 7 is a value of $L_{cascade}$ for the degree of certainty in a case in which the estimation results of both the lightweight model and the high-precision model are incorrect answers. In this case, the value of $L_{cascade}$ becomes smaller when the degree of certainty is higher. However, the value of $L_{cascade}$ is larger than that of "□." This is because the loss is always high from the fact that the estimation results of both models are incorrect answers, and in such a situation, an accurate estimation should be able to be made by the lightweight model.

Training Processing

Figure 8:
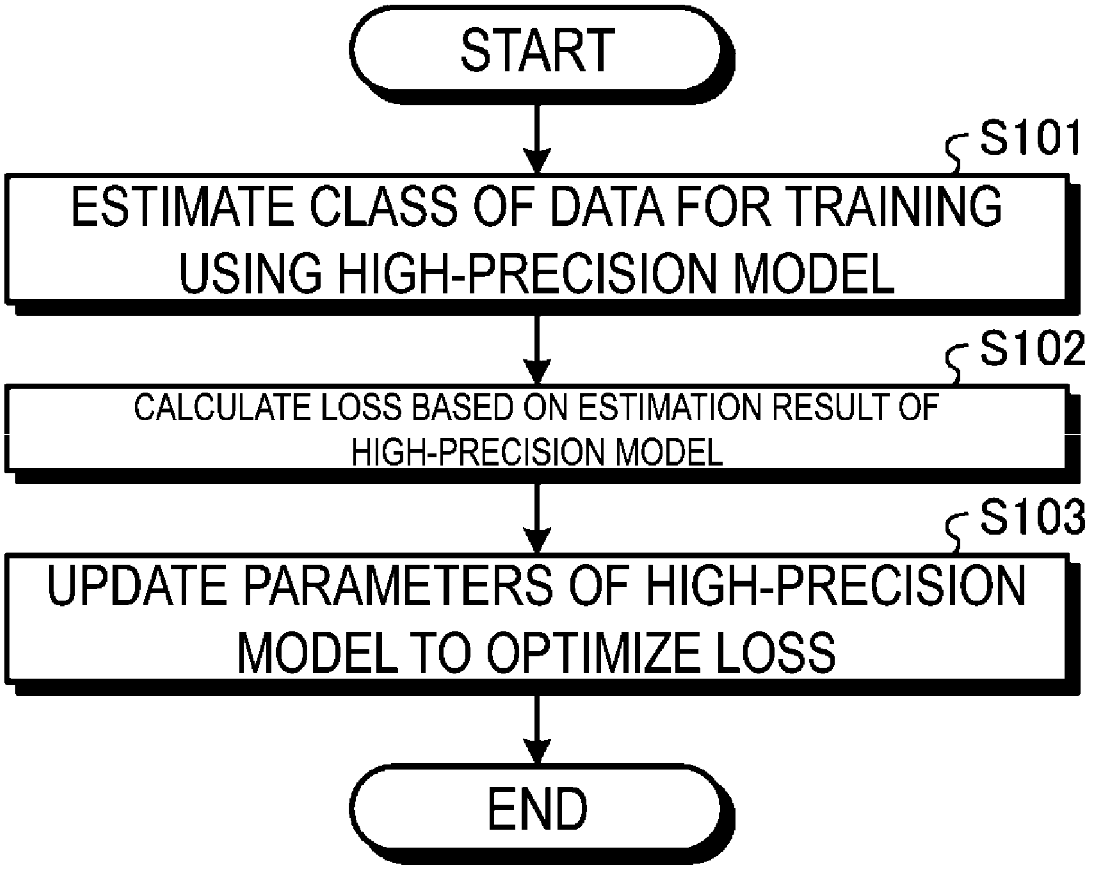
FIG. 8 is a flowchart illustrating training processing of the high-precision model.

FIG. 8 is a flowchart illustrating training processing of the high-precision model. As illustrated in FIG. 8, first, the estimation unit 111 estimates a class of data for training using the high-precision model (step S101).

Then, the loss calculation unit 112 calculates a loss based on the estimation result of the high-precision model (step S102). Then, the update unit 113 updates the parameters of the high-precision model so that the loss is optimized (step S103). The training device 10 may repeat the processing from step S101 to step S103 until an end condition is satisfied. The end condition may be that processing is repeated a predetermined number of times, or that a parameter update width has converged.

Figure 9:
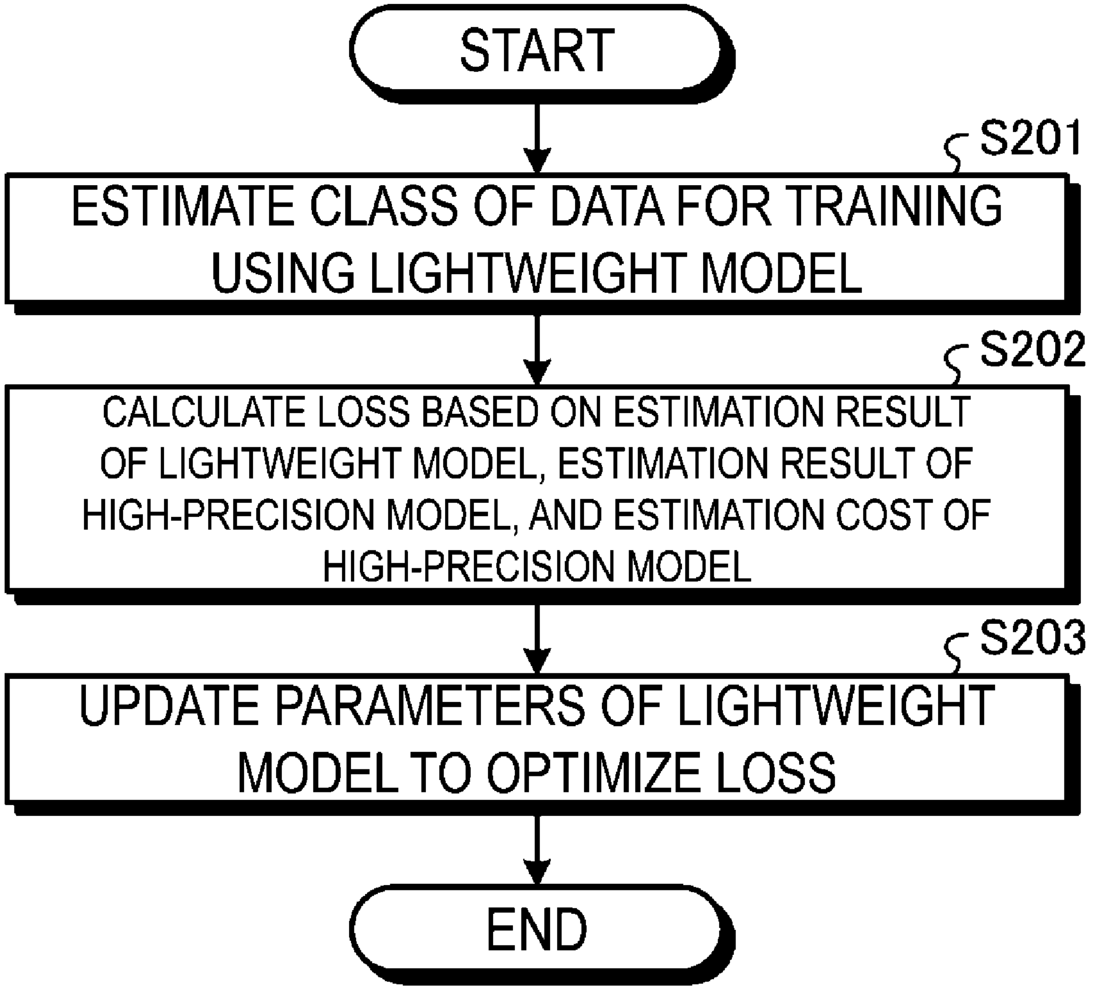
FIG. 9 is a flowchart illustrating training processing of the lightweight model.

FIG. 9 is a flowchart illustrating the training process of the lightweight model. As illustrated in FIG. 9, first, the estimation unit 121 estimates a class of data for training using the lightweight model (step S201).

Then, the loss calculation unit 122 calculates the loss based on the estimation result of the lightweight model, the estimation result of the high-precision model, and a cost of estimation of the high-precision model (step S202). The update unit 123 updates the parameters of the lightweight model so that the loss is optimized (step S203). The training device 10 may repeat the processing from step S201 to step S203 until the end condition is satisfied.

Thus, the estimation unit 121 inputs the data for training to the lightweight model that outputs the estimation result based on the input data, and acquires a first estimation result. Further, the update unit 123 updates the parameters of the lightweight model so that the model cascade including the lightweight model and the high-precision model is optimized, based on the first estimation result, and a second estimation result obtained by inputting data for training to the high-precision model having a lower processing speed and a higher estimation accuracy than the lightweight model, which is a model that outputs an estimation result based on the input data. Thus, the training device 10 can improve the performance of the model cascade by enabling the lightweight model to perform estimation suitable for the model cascade in the model cascade including the lightweight model and the high-precision model. As a result, the training device 10 can improve the accuracy of the model cascade, and also curb a calculation cost and an overhead of the calculation resource. Further, in Embodiment 1, because a loss function is changed, it is not necessary to change a model architecture, and there is no limitation on a model and an optimization scheme to be applied.

The update unit 123 updates the parameters of the lightweight model so as to minimize a loss calculated based on the loss function including the first term that becomes larger when the degree of certainty of the correct answer in the first estimation result becomes lower, the second term that becomes larger when the degree of certainty of the first estimation result is higher in a case in which the first estimation result is an incorrect answer, the third term that becomes larger when the degree of certainty of the first estimation result becomes lower in a case in which the second estimation result is an incorrect answer, and the fourth term that becomes larger when the degree of certainty of the first estimation result becomes lower. As a result, in Embodiment 1, it is possible to improve estimation accuracy of the model cascade in consideration of a cost when the estimation result of the high-precision model is adopted in the model cascade including the lightweight model and the high-precision model.

In the processing system 100, when inference is performed using the high-precision model and the lightweight model that are trained by the training device 10, the edge device 30 inputs the data for inference to the lightweight model (DNN1), acquires the degree of certainty, and adopts the estimation result of the lightweight model by the lightweight model when the degree of certainty is equal to or higher than a threshold value. Further, the edge device 30 transmits data for processing to the server device 20 in a case in which the degree of certainty is smaller than the threshold value. The processing system adopts an estimation result of the high-precision model (DNN2) of the server device 20 acquired by inputting the data for inference to the high-precision model.

Although the example in which DNN has been trained has been described in Embodiment 1, a machine training mechanism other than DNN may be used.

Embodiment 2

Next Embodiment 2 will be described. In Embodiment 2, the edge device encodes the data for processing and then transmits the encoded data to the server device.

Figure 10:
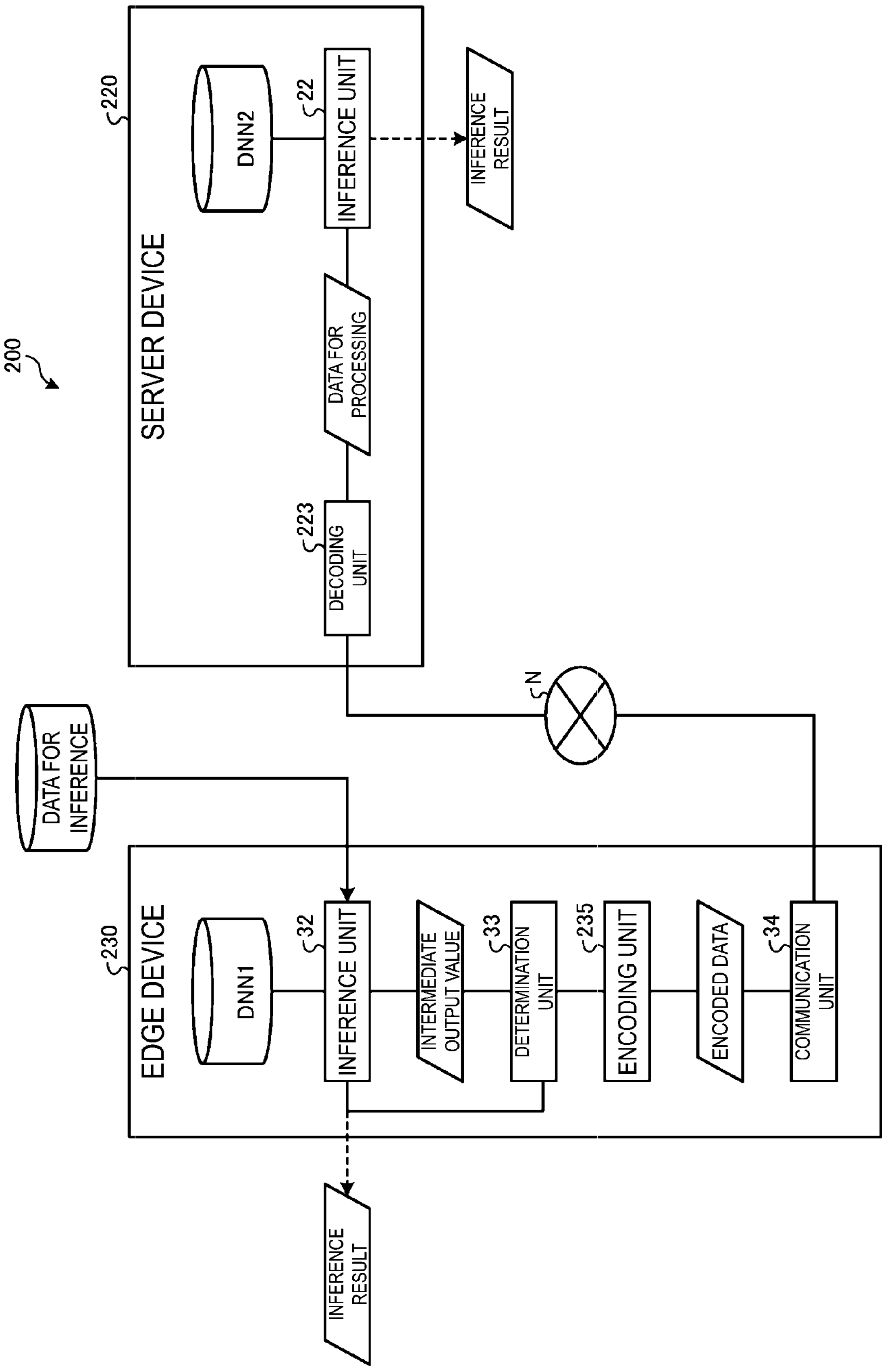
FIG. 10 is a diagram schematically illustrating an example of a configuration of a processing system according to Embodiment 2.

FIG. 10 is a diagram schematically illustrating an example of a configuration of a processing system according to Embodiment 2. A processing system 200 according to Embodiment 2 includes a server device 220 instead of the server device 20 illustrated in FIG. 4, and an edge device 230 instead of the edge device 30.

The edge device 230 includes an encoding unit 235 as compared with the edge device 30. The encoding unit 235 encodes data to be transmitted to the server device 220 by the communication unit 34. For example, the encoding unit 235 compresses data to be transmitted to reduce an amount of communication. In a case in which the data transmitted to the server device 220 is set as the output value of the intermediate layer of DNN1, even when the data is eavesdropped, an eavesdropper cannot interpret a meaning of the transmitted data, thereby guaranteeing security.

As the intermediate output value, a value that is easier to encode than other intermediate output values is selected from among a plurality of intermediate output values of DNN1 output in processing of outputting the inference result for the data for inference. The value that is easier to encode has a smaller entropy or a higher sparsity than those of the other intermediate output values. For example, the intermediate output value is an intermediate output value of an intermediate layer of trained DNN1 that has been trained so that an entropy of an output value of a desired intermediate layer becomes small. The intermediate output value is an intermediate output value of an intermediate layer of trained DNN1 that has been trained so that output value sparsity of a desired intermediate layer is increased.

The server device 220 includes a decoding unit 223 as compared with the server device 20. The decoding unit 223 decodes the data for processing encoded by the encoding unit 235 and outputs it to the inference unit 22.

Here, when DNN1 and DNN2 are models in which DNN3 (see FIG. 3) trained as an integrated DNN is divided into DNN1b and DNN2b using the predetermined criterion, it is desirable to construct the encoding unit 235 that is efficient and has little distortion in the inference result.

For example, when data of a whole training set is trained, a maximum value and a frequency of generation of zero can be seen for each node of the intermediate layer as a transfer target and thus, the encoding unit 235 is designed to perform encoding processing corresponding to this. The encoding processing may be processing for reducing a dimension of a representation space of an encoding target by underestimating an influence of a node with a high frequency of zero generation, or may be processing for determining a range of values of each node to select a scheme reflecting a tendency thereof or determine quantization granularity.

Further, the encoding unit 235 may perform encoding based on a vector quantization scheme. In this case, the encoding unit 235 does not individually quantize values of the nodes, but regards the values of all the nodes as vectors, clusters the values in a vector space, and encodes the values.

Further, a layer having a small entropy is obtained and DNN3 is divided at the layer so that the encoding unit 235 can obtain an intermediate output value having a small entropy.

Further, the encoding unit 235 and the decoding unit 223 may adopt an encoding and decoding scheme based on a known rule or may adopt a scheme based on training such as an auto encoder (AE) or a variational auto encoder (VAE).

The encoding unit 235 may switch an encoding scheme for the data for processing according to the intermediate output value and DNN2 serving as a transmission destination among a plurality of encoding methods. The decoding unit 223 decodes the data using a scheme corresponding to the encoding scheme executed by the encoding unit 235.

Processing Procedure of Processing System

Figure 11:
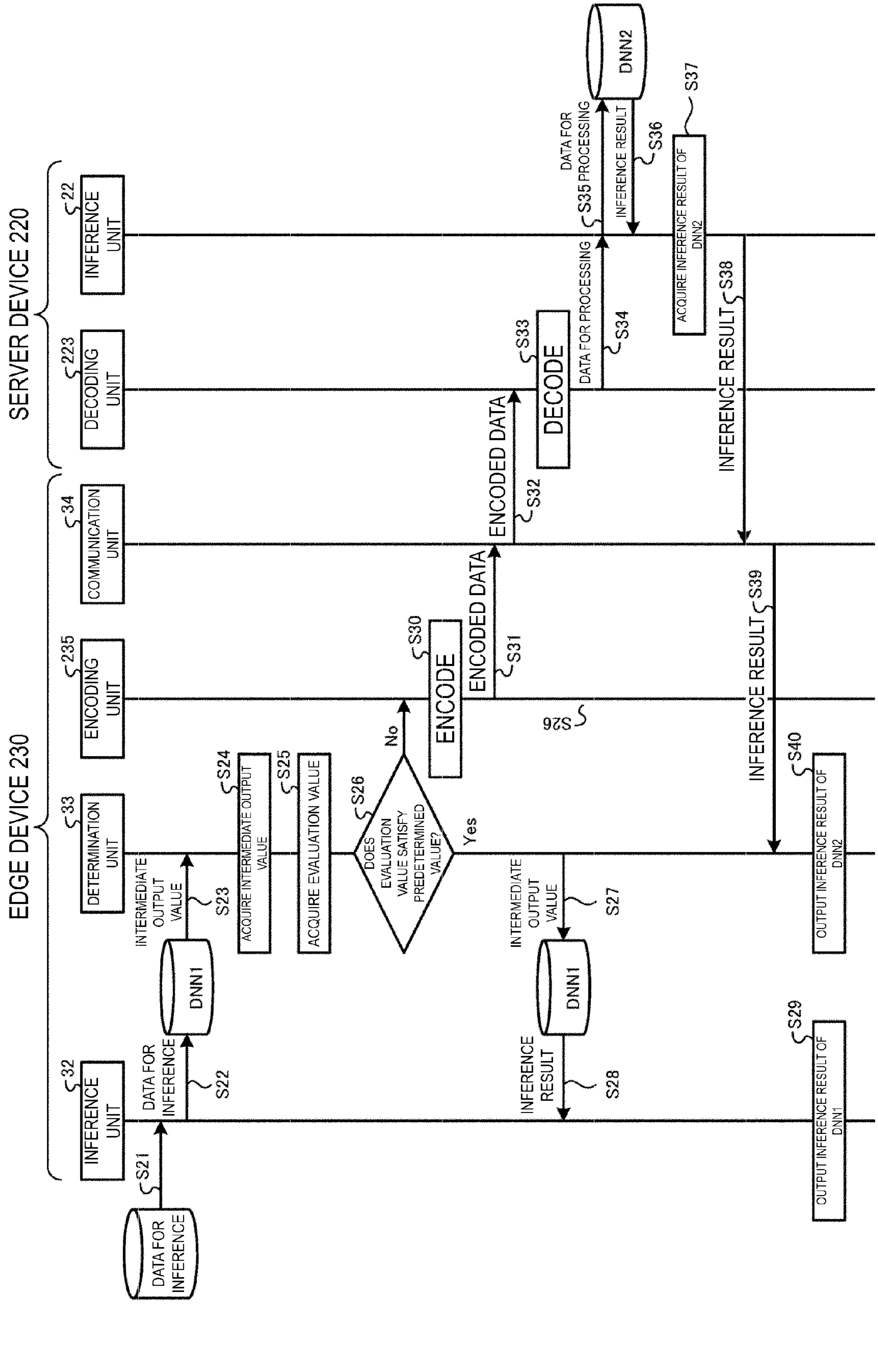
FIG. 11 is a sequence diagram illustrating processing of the processing system according to Embodiment 2.

FIG. 11 is a sequence diagram illustrating processing of the processing system according to Embodiment 2. Steps S21 to S29 illustrated in FIG. 11 are the same processing operations as steps S1 to S9 illustrated in FIG. 5.

When the evaluation value does not satisfy the predetermined value (step S26: No), the encoding unit 235 encodes data for processing for causing the server device 220 to execute the inference processing (step S30) and transmits the coded data to the server device 220 via the communication unit 34 (steps S31 and S32). In the server device 220, the decoding unit 223 decodes the coded data (step S33) and outputs the decoded data for processing to the inference unit 22 (step S34). Steps S35 to S40 are the same as steps S1*l* to S16 illustrated in FIG. 5.

Effects of Embodiment 2

Thus, in Embodiment 2, the edge device 230 encodes the data for processing and then transmits the data for processing to the server device 220, thereby enabling transmission of the processing data with security, transmission of the processing data in a data format with less distortion in the inference result, or efficient transmission of the processing data.

Figure 12:
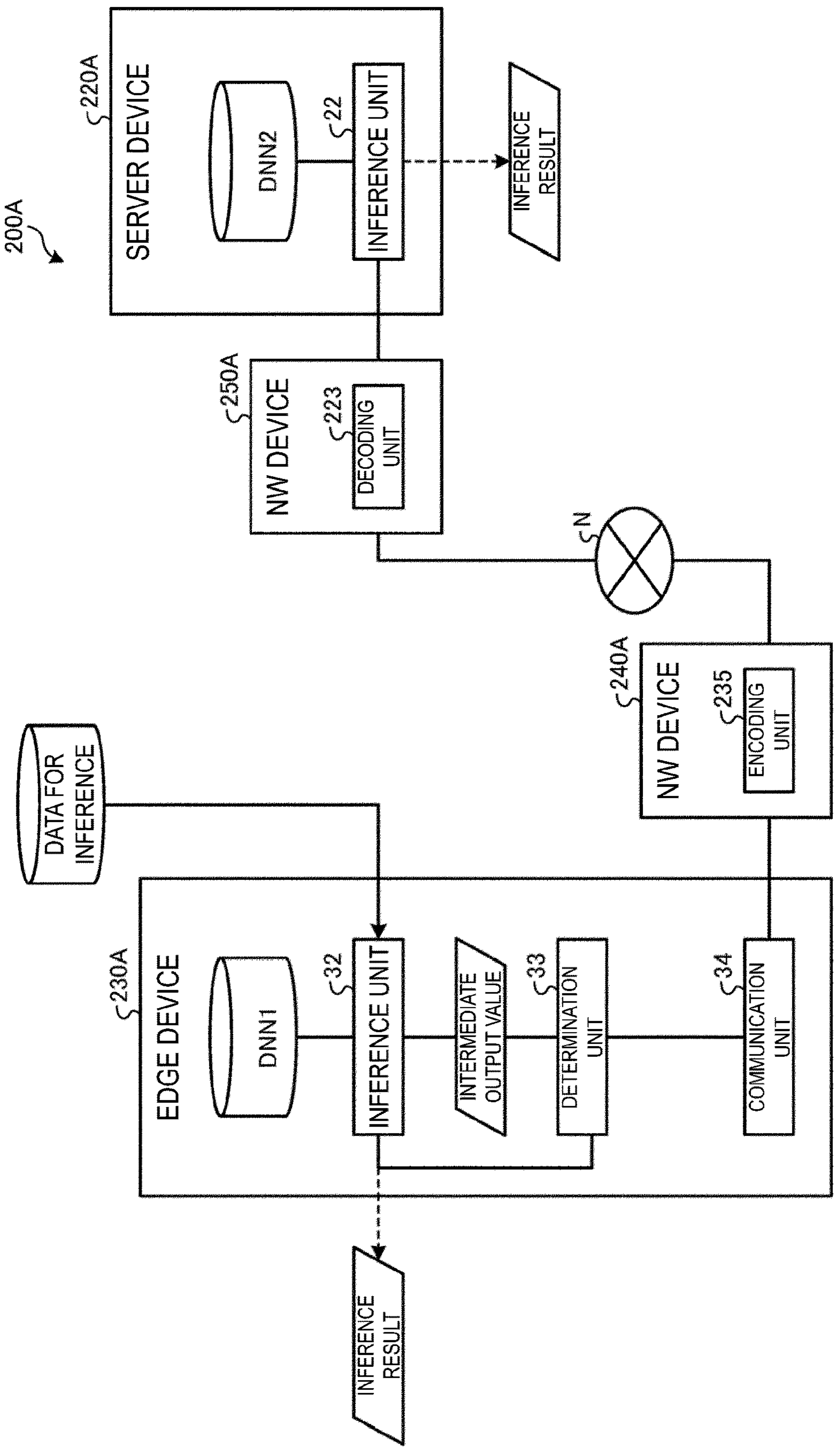
FIG. 12 is a diagram schematically illustrating another example of the configuration of the processing system according to Embodiment 2.

In Embodiment 2, the configuration in which the edge device 230 includes the encoding unit 236 and the server device 220 includes the decoding unit 223 has been described, but the present disclosure is not limited to thereto. FIG. 12 is a diagram schematically illustrating another example of the configuration of the processing system according to Embodiment 2. As illustrated in FIG. 12, the encoding unit 235 may be provided in a NW device 240A proximate to the edge device 230A between the edge device 230A and the server device 220A, and the decoding unit 223 may be provided in a NW device 250A proximate to the server device 220A.

Further, in Embodiment 2, there may be a plurality of the edge devices 230 or a plurality of the server devices 220, and there may be both the plurality of edge devices 230 and the plurality of server devices 220.

Embodiment 3

Figure 13:
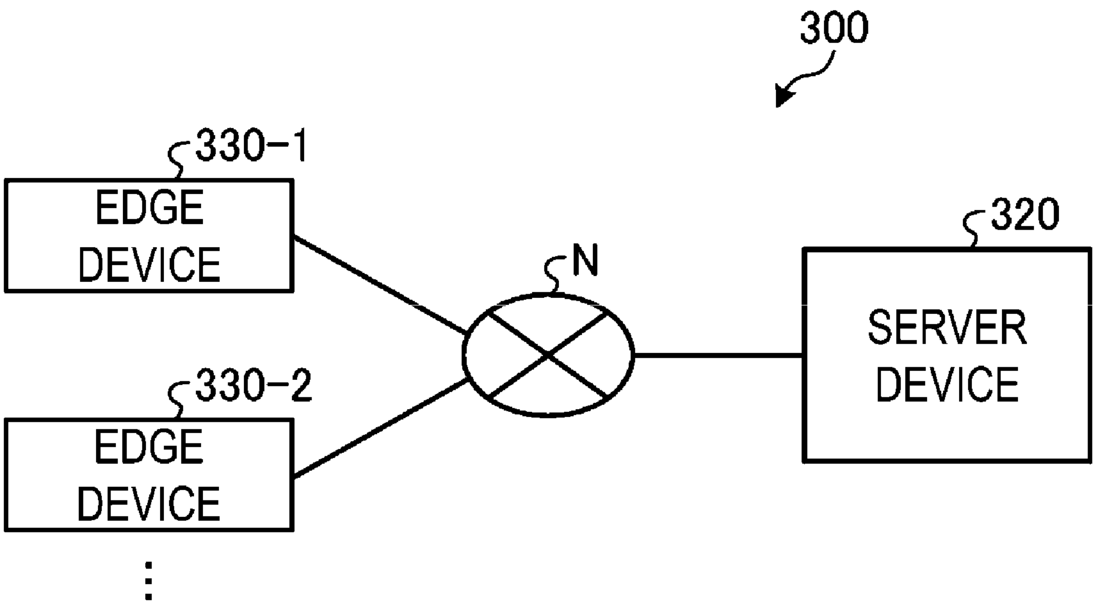
FIG. 13 is a diagram schematically illustrating an example of a configuration of a processing system according to Embodiment 3.

Next, Embodiment 3 will be described. FIG. 13 is a diagram schematically illustrating an example of a configuration of a processing system according to Embodiment 3. As illustrated in FIG. 13, a processing system 300 according to Embodiment 3 has a configuration in which a plurality of edge devices 330-1 and 330-2 are connected to one server device 320 via a network N. The number of edge devices illustrated is an example, and may be three or more. When the edge devices 330-1 and 330-2 are collectively referred to, the edge devices 330-1 and 330-2 are referred to as edge devices 330.

Figure 14:
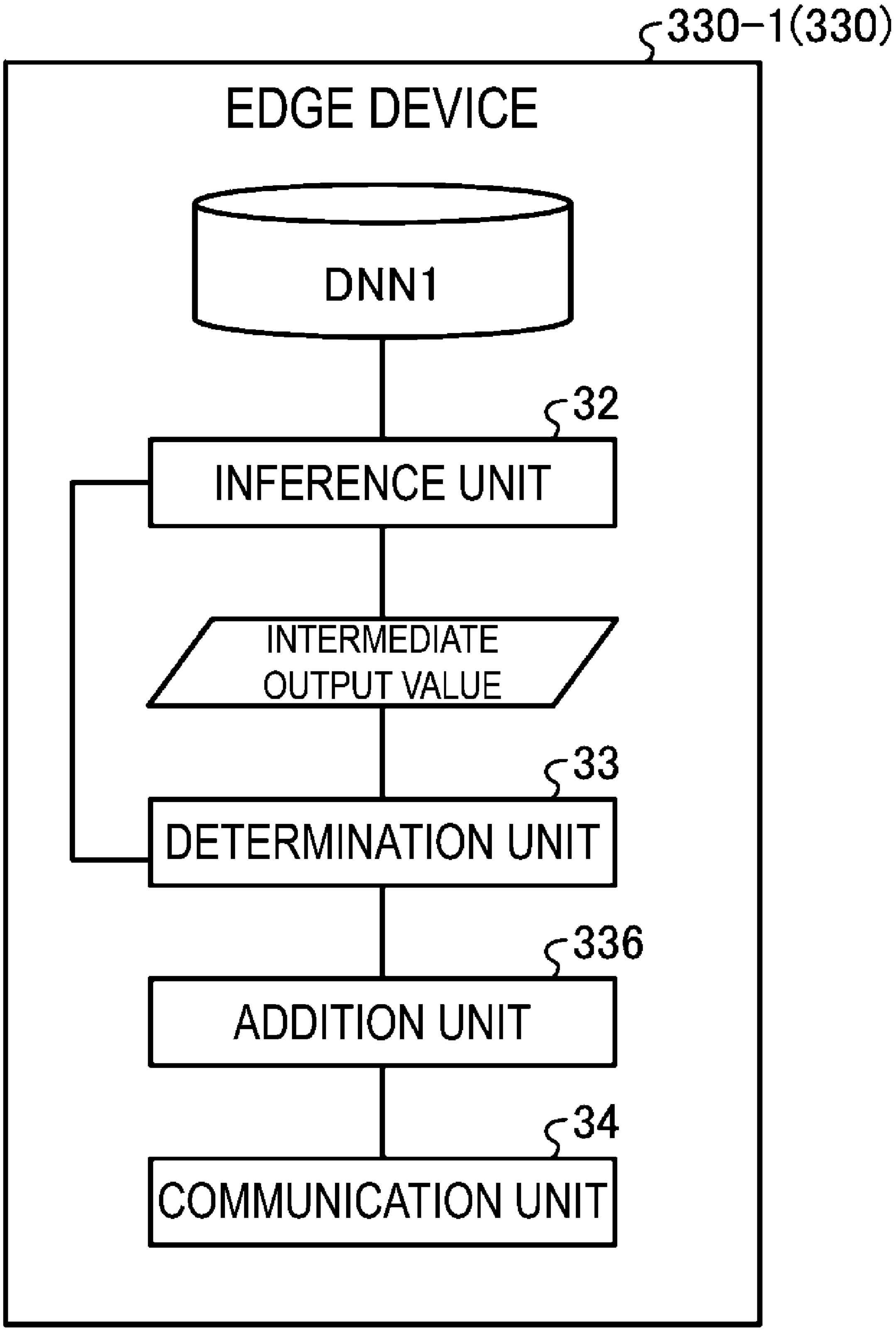
FIG. 14 is a diagram schematically illustrating an example of an edge device illustrated in FIG. 13.

FIG. 14 is a diagram schematically illustrating an example of the edge device 330-1 illustrated in FIG. 13. As illustrated in FIG. 14, the edge device 330-1 includes an addition unit 336 as compared with the edge device 30. The addition unit 336 adds a code for identifying the edge device to the data for processing. The communication unit 34 transmits the code for identifying the edge device to the server device 320 together with the intermediate output value that is the data for processing.

The edge device 330-2 also has the same configuration as the edge device 330-1. In this case, DNN1 included in the respective edge devices 330 may be the same models.

Further, DNN1 included in each edge device 330 may be a model formed by multi-task training that is common up to the predetermined intermediate layer due to consensus between the models. The consensus between models means that, for example, training is performed while consensus is being formed between intermediate layers that are the same-level layers of a plurality of models. That is, it may be said that two terms including a cost term related to a problem set for itself in a case in which different pieces of training data are given to respective models, and a cost term for forming consensus between intermediate layers that are the same-level layer of another model have been optimized at the same time. As a result, DNN1 included in each edge device 330 may be a model trained so that weights from the input layer up to the predetermined intermediate layer are the same. For example, DNN1 included in each edge device 330 is common up to a feature extraction layer for an acoustic signal, and subsequent layers perform different processing. In this case, the intermediate output value output by each edge device 330 is set to be an output value from a common layer. Of course, the edge device 330 may transmit different output values of the intermediate layers to the server device 320.

Figure 15:
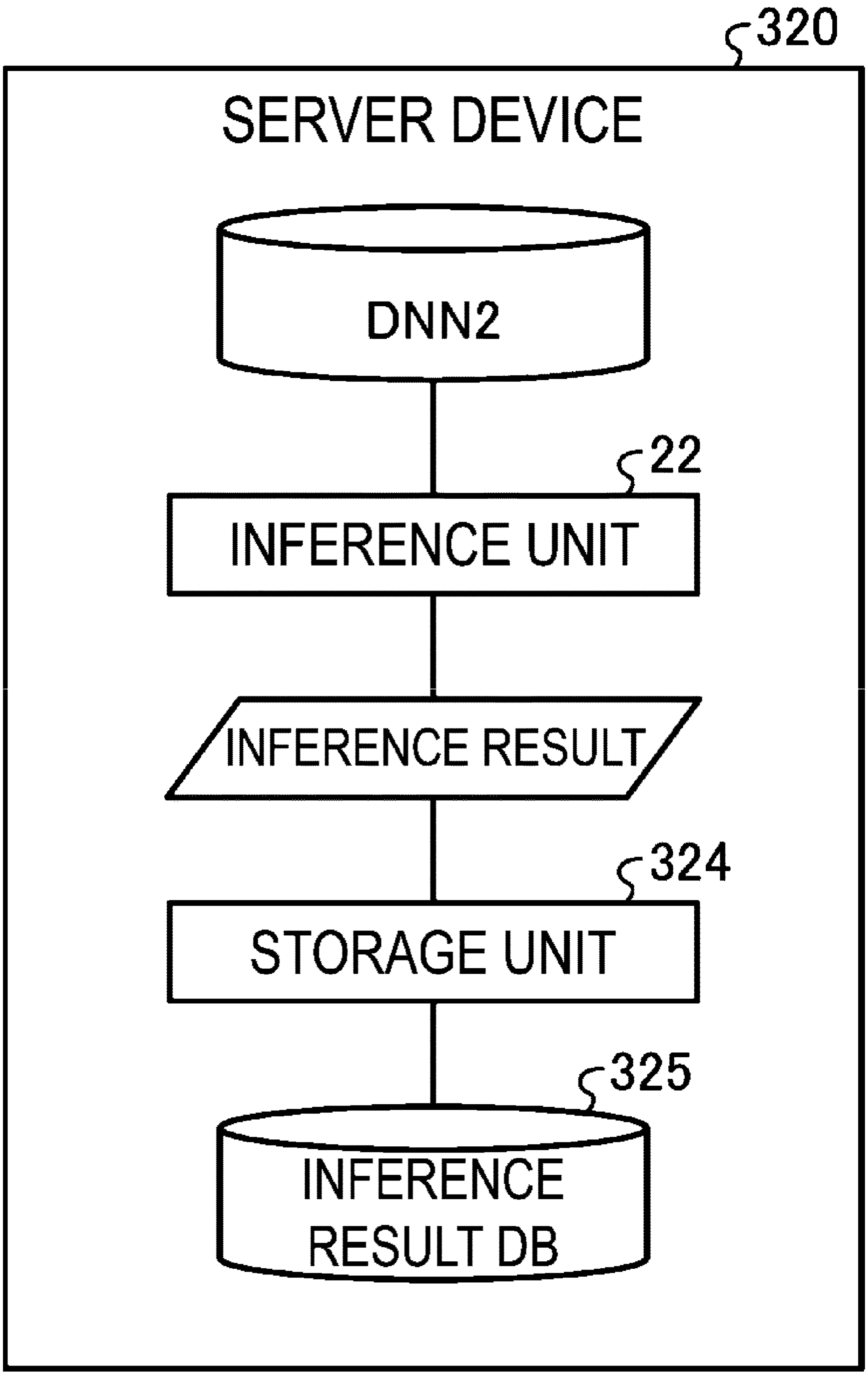
FIG. 15 is a diagram schematically illustrating an example of a server device illustrated in FIG. 13.

FIG. 15 is a diagram schematically illustrating an example of the server device 320 illustrated in FIG. 13. As illustrated in FIG. 15, the server device 320 includes a storage unit 324 and an inference result database (DB) 325 as compared with the server device 20. The storage unit 324 stores a result (inference result) obtained by the inference unit 22 analyzing the intermediate output value and a code for identifying the edge device 330 that has transmitted the data for processing in the inference result DB 325 in association with each other.

In the processing system 300, processing that is performed by the edge device 330 and processing that is performed by the server device 320 are optimized, so that the inference processing is performed on data transmitted from any one of the plurality of edge devices 330. For example, DNN2 of the server device 320 is optimized to be able to handle any data for processing transmitted from any one of the edge devices 330.

Processing Procedure of Processing System

Figure 16:
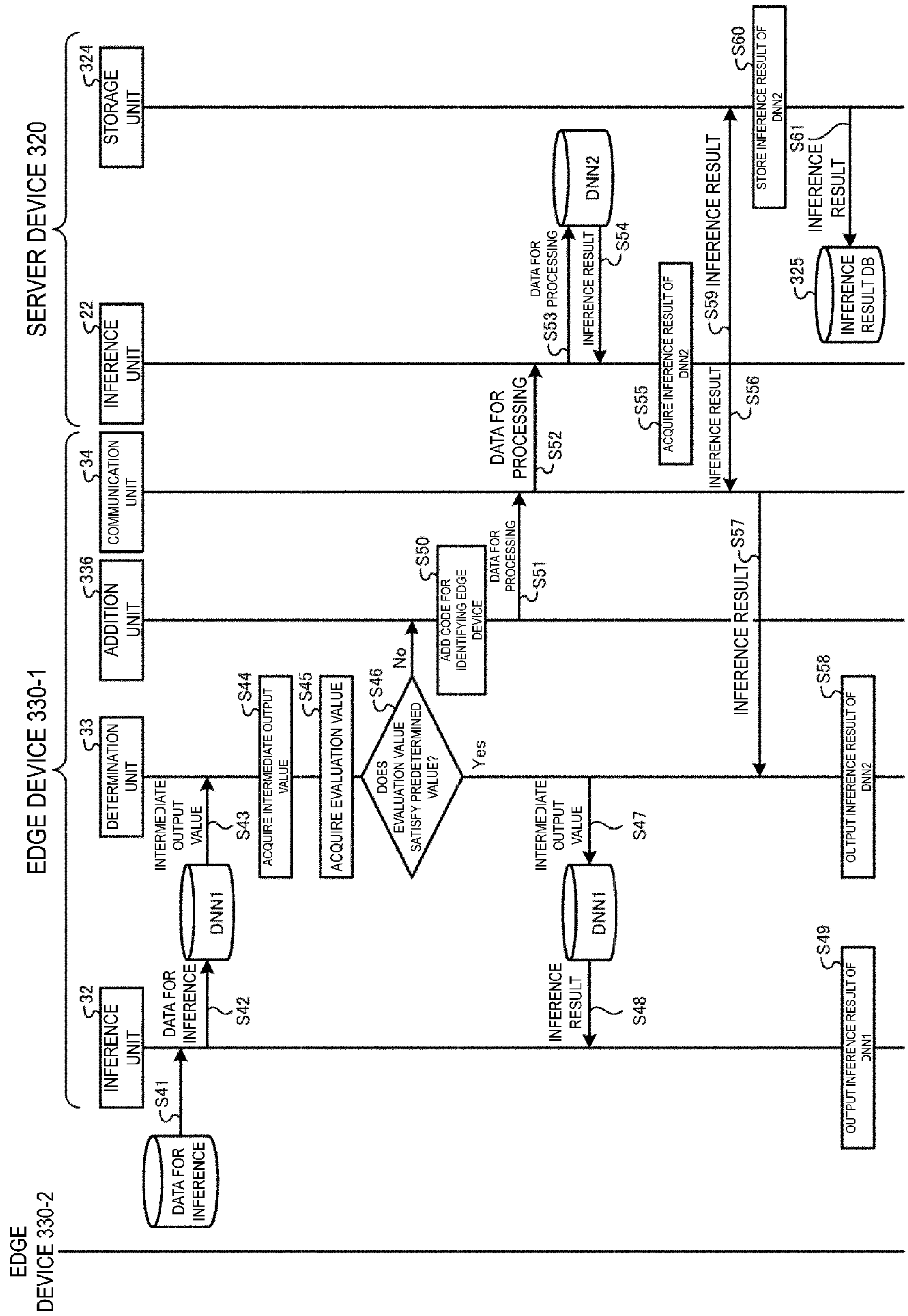
FIG. 16 is a sequence diagram illustrating processing of the processing system according to Embodiment 3.

FIG. 16 is a sequence diagram illustrating processing of the processing system according to Embodiment 3. Steps S41 to S49 illustrated in FIG. 16 are the same processing operations as steps S1 to S9 illustrated in FIG. 5.

When the evaluation value does not satisfy the predetermined value (step S46: No), the addition unit 336 adds the code for identifying the edge device to the data for processing (step S50). The communication unit 34 transmits the code for identifying the edge device to the server device 320 together with the intermediate output value that is the data for processing (steps S51 and S52).

Steps S53 to S58 illustrated in FIG. 16 are the same as steps S1*l* to S16 illustrated in FIG. 5. In the server device 320, the storage unit 324 stores the inference result and the code for identifying the edge device 330 that has transmitted the data for processing in the inference result DB 325 in association with each other (steps S59 to S61).

Effects of Embodiment 3

Thus, in Embodiment 3, even when the plurality of edge devices 330 are connected, DNN2 of the server device 320 is optimized to be able to handle any data for processing transmitted from any one of the edge devices 330. The edge device 330 transmits the code for identifying the own device together with the intermediate output value that is the data for processing to the server device 320. Thus, DNN2 of the server device 320 can appropriately execute the inference processing using the processing data by recognizing the data for processing transmitted from any one of the edge devices 330.

The processing system 300 may include the encoding unit 235 and the decoding unit 223 described in Embodiment 2.

Embodiment 4

Figure 17:
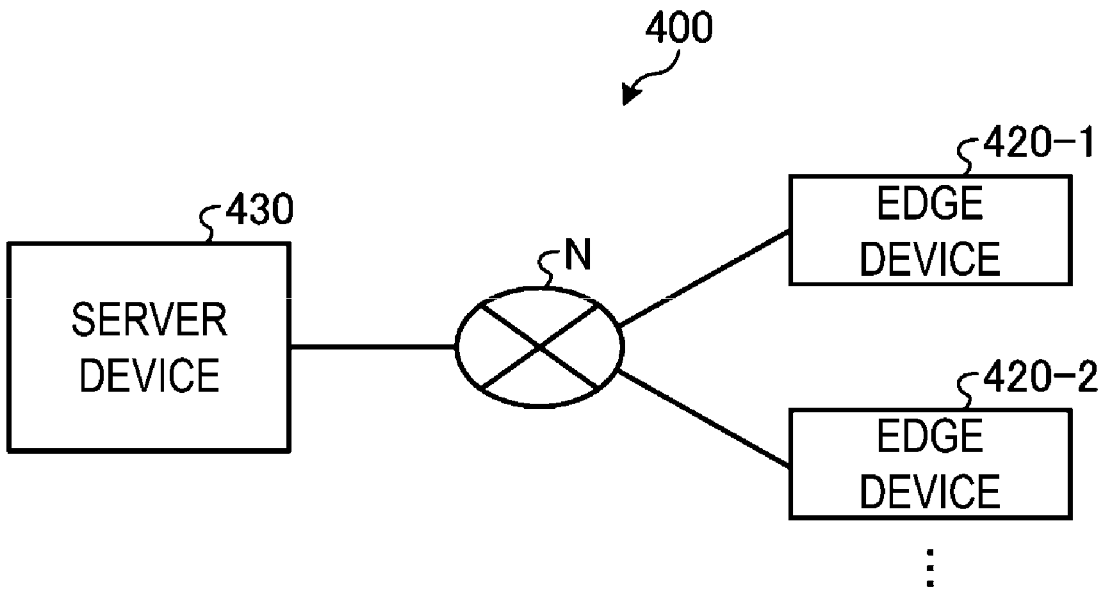
FIG. 17 is a diagram schematically illustrating an example of a configuration of a processing system according to Embodiment 4.

Next, Embodiment 4 will be described. FIG. 17 is a diagram schematically illustrating an example of a configuration of a processing system according to Embodiment 4. As illustrated in FIG. 14, a processing system 300 according to Embodiment 4 has a configuration in which an edge device 430 is connected to a plurality of server devices 420-1 and 420-2 via a network N. The number of server devices illustrated is an example, and may be three or more. When the server devices 420-1 and 420-2 are collectively referred to, the server devices 420-1 and 420-2 are referred to as server devices 420.

The DNN2 included in each server device 420 performs a different task, for example. For example, DNN2 of the server device 420-1 classifies a type (an image or an acoustic signal) of the target data. DNN2 of the server device 420-2 classifies nature (for example, a human or a vehicle in the case of a subject recognition task) of the target data. Further, DNN2 of the other server device 420 classifies processing content (a subject recognition task or a sound enhancement task) for processing of the target data. For example, when DNN1 of the edge device 430 is a model that performs data feature extraction, DNN2 of each server device 420 is specialized for a corresponding task given to the server device 420. When different tasks are to be performed, so-called multi-task training may be used. Specifically, layers including up to the predetermined intermediate layer trained so that the weights from the input layer up to the predetermined intermediate layer are common for task 1 and task 2 may be disposed in the edge device 430, and layers subsequent to the predetermined intermediate layer may be disposed in the server device 420. This makes it possible to achieve a configuration in which, for any task, processing can be performed by a model disposed in any server device while a model disposed in the edge device 430 is used in common. Further, the different tasks may be used for the same purpose and have different estimation accuracy. For example, the estimation accuracy may have the relationship: the estimation accuracy of the edge device 430<the estimation accuracy of the server device 420-1<the estimation accuracy of the server device 420-2.

Figure 18:
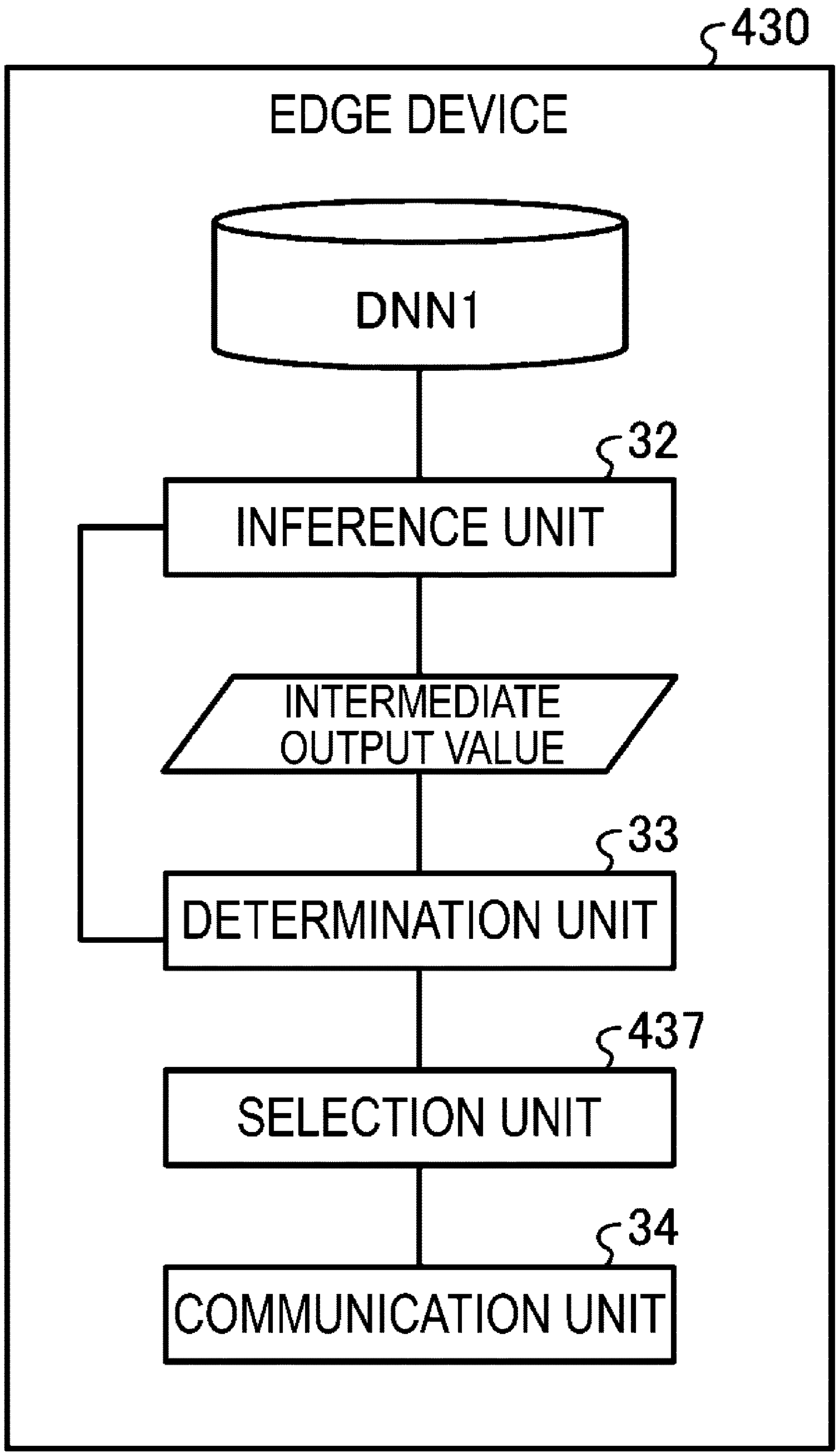
FIG. 18 is a diagram schematically illustrating an example of an edge device illustrated in FIG. 17.

FIG. 18 is a diagram schematically illustrating an example of the edge device 330-1 illustrated in FIG. 17. As illustrated in FIG. 18, the edge device 430 includes a selection unit 437 as compared with the edge device 30. The selection unit 437 selects the server device 420 that transmits the data for processing from among the plurality of server devices 420 according to the purpose of processing of the data for inference.

Processing Procedure of Processing System

Figure 19:
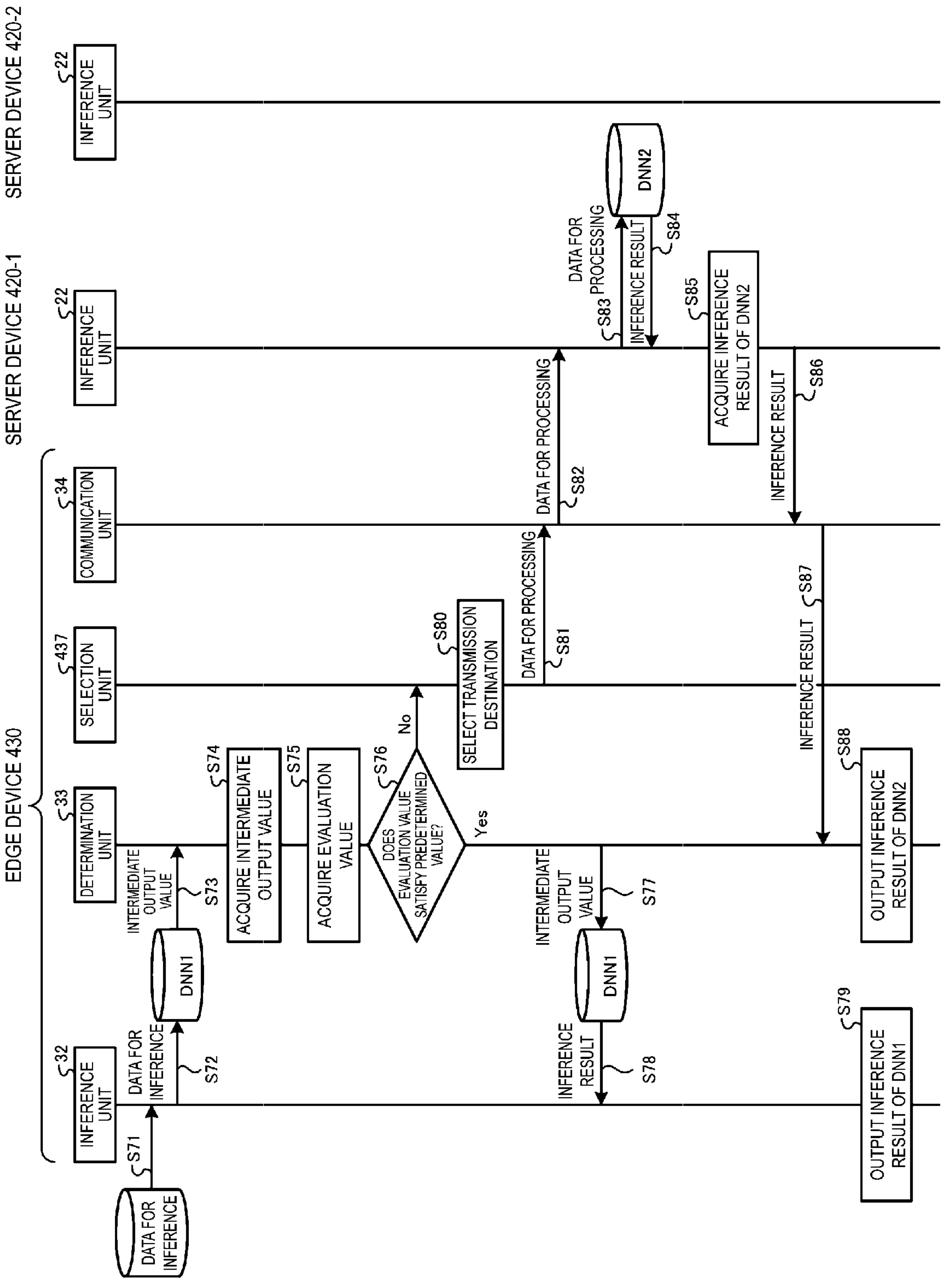
FIG. 19 is a sequence diagram illustrating processing of the processing system according to Embodiment 3.

FIG. 19 is a sequence diagram illustrating processing of the processing system according to Embodiment 4. Steps S71 to S79 illustrated in FIG. 19 are the same processing operations as steps S1 to S9 illustrated in FIG. 5.

When the evaluation value does not satisfy the predetermined value (step S76: No), the selection unit 437 selects the server device 420 serving as a transmission destination according to the purpose or accuracy of processing of the data for inference (step S80). The communication unit 34 transmits the data for processing to the server device 420 (for example, the server device 420-1) selected by the selection unit 437 (steps S81 and S82). Steps S83 to S88 illustrated in FIG. 19 are the same processing operations as steps S11 to S16 illustrated in FIG. 5. The selection unit 437 that selects a transmission destination (step S80) may be physically and/or logically disposed in the edge device or in the server device. Further, the selection unit 437 may be on the network (a position that cannot be distinguished from the server and the edge).

Effects of Embodiment 4

Thus, in Embodiment 4, even in a case in which the edge device 430 is connected to the plurality of server devices 420, it is possible to appropriately execute the inference processing by selecting the server device 420 serving as a transmission destination according to the purpose of processing of the data for inference.

In Embodiment 4, there may be a plurality of the edge devices 430. Further, the processing system 400 may include a selection unit 437 in a NW device between the edge device and the server device. Further, the processing system 400 may include the encoding unit 235 and the decoding unit 223 described in Embodiment 2. In this case, a place at which the selection unit 237 is disposed may be a front stage of the code unit 235 or may be a rear stage of the code unit 235.

Modification Example

Figure 20:
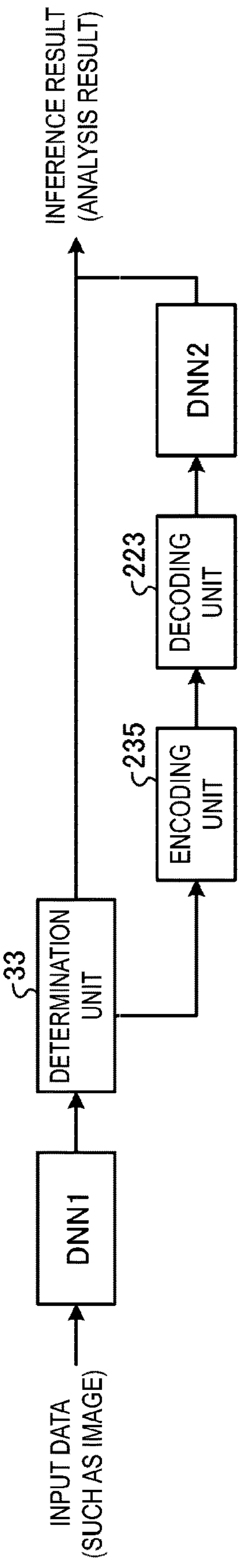
FIG. 20 is a diagram illustrating an overview of a processing system according to a modification example of Embodiments 1 to 4.

Next, a modification example of Embodiments 1 to 4 will be described. FIG. 20 is a diagram illustrating an overview of a processing system in the modification example of Embodiments 1 to 4. Hereinafter, variations of functions of DNN1, DNN2, the determination unit 33, the encoding unit 235, the decoding unit 223, and DNN2 illustrated in FIG. 20 and variations of communication contents will be described with reference to FIG. 21.

FIG. 21 is a diagram illustrating the variations of the functions of DNN1, DNN2, the determination unit 33, the encoding unit 235, and the decoding unit 223, and the variations of the communication contents. Among columns illustrated in FIG. 21, (1-A) to (1-H) indicate variations in functions of DNN1 and DNN2. Further, (2-A) to (2-G) indicate variations in the functions of the determination unit 33. Further, (3ˆA) to (3-F) indicate variations of the encoding unit 235, the decoding unit 223, and the communication contents between the edge device and the server device. Each functional unit and communication content may be shown in each of these columns.

Further, each functional unit and communication content can also be operated in combination. For example, when independent DNN1a and DNN2a are used (see FIG. 2), it is possible to combine functions and communication contents of (1-D), (2-C), and (3-A) with each other. Further, when DNN1b and DNN2b obtained by dividing the integrated DNN3 are used (see FIG. 3), it is possible to combine any one of (1-D) and (1-G), any one of (2-C) and (2-D), and any of (3-B), (3-C), (3-D-1), (3-D-2), and (3-D-3) with each other.

The present disclosure can be applied to various cases in which there are various requests from users. Some specific examples will be described.

Automated Driving

An example will be described in which a computation device such as a digital signal processor (DSP) disposed in a vehicle is set as an edge and cooperates with a cloud. For example, processing in which both an amount of computation and an amount of transfer tend to increase, but a response is slow, such as navigation in consideration of traffic congestion, may be processed by the server device, and event detection or a determination of control of a vehicle according to the detected event related to direct control of the vehicle, for example, may be processed by the edge device because a certain degree of accuracy and speed of response are required.

Change Detection

When a time-series image signal is a target, the presence or absence of a change compared by the edge device with a normal time or a previous frame may be detected by the edge device, and estimation of a type of change may be performed by the server device.

The time-series image signal may be a surveillance camera data or may be a satellite image or an aerial photograph. In the case of the surveillance camera, the edge device may detect a person passing in front of the surveillance camera as a change, and the server device may estimate what kind of person has passed. In the case of the satellite image, the edge device may detect a change in edges or texture of a building, or passage of a ship or a vehicle as the change, and the server device may estimate what kind of building has been built, a construction situation, what kind of ship has passed, or the like. In this case, a computation device disposed on an airplane or satellite may be treated as an edge.

Crime Prevention

Relatively simple and lightweight inference (counting of the number of people, estimation of sex, age, and the like, rough determination of clothing, and the like) is performed by an edge device, and more burdensome and complicated inference (person identification, posture estimation, suspicious person detection, and the like) is performed in a cloud (a server device).

Further, detection of known people requiring attention, such as a virtual IP (VIP), a repeater, or a complainer, which requires a quick response, is performed by the edge device, and detection of more general people, feature extraction for the people, conversion to a DB, and the like, which do not require a quick response, are performed in the cloud.

Agriculture

For an unmanned control tractor, confirmation that there are no obstacles in front is performed by an edge device (the tractor alone), and inference and planning including how to deal with the obstacles are performed in a cloud.

Inference-Based Vision

A video from a camera is received at a station building, and video processing (normal two-layer inference) is performed, and a processing result is sent to a cloud, and more advanced processing or aggregate processing (multi-stage inference) is performed. In a case in which resources of a certain station building A are exhausted, and resources are available in an adjacent station building B, partially processed data of the station building A is sent to the station building B under the control of the cloud, and the rest of the processing is performed. This enables resources to be efficiently used (service robustness, efficient use of resources). This means that a computation device or the like disposed in a station building may be controlled as a so-called edge cloud.

Control of Drone Camera Group

Arrangement of individual drone cameras or recovery support between the cameras according to situations under an overall photographing plan of a plurality of drone camera groups, for example, is controlled and instructed on the cloud, and an inference and determination related to a response to a situation unique to each drone camera or the like (for example, avoidance in a case in which an obstacle suddenly appears in front of the camera) is performed on the drone (edge device). In this example, Embodiment 3 is applied in which the large number of edge devices and the one server device are provided.

Further, an application example of Embodiment 4 will be described in which the one edge device and the large number of server devices are provided. A feature of one camera image is obtained in an edge (DNN1), and the feature is passed to a plurality of clouds in parallel and used in common to perform various task processing (counting the number of people, identifying a person, class classification, posture estimation, or the like). This is a case in which the one edge device and the large number of server devices are provided, and encoding processing is applied for privacy protection.

System Configuration and the Like

Each component of each illustrated device is a functionally conceptual component and does not necessarily need to be physically configured as illustrated in the drawings. That is, a specific form of distribution and integration of the respective devices is not limited to the form illustrated in the drawings, and all or some of the devices can be distributed or integrated functionally or physically in any units according to various loads, use situations, and the like. Further, all or some of processing functions to be performed in each of the devices can be implemented by a CPU and a program analyzed and executed by the CPU, or can be achieved as hardware using wired logic.

Further, all or some of the processing described as being performed automatically among the processing described in the present embodiment can be performed manually, and alternatively, all or some of the processing described as being performed manually can be performed automatically using a known method. In addition, information including the processing procedures, control procedures, specific names, and various types of data or parameters illustrated in the above literature or drawings can be freely changed unless otherwise described.

Program

Figure 22:
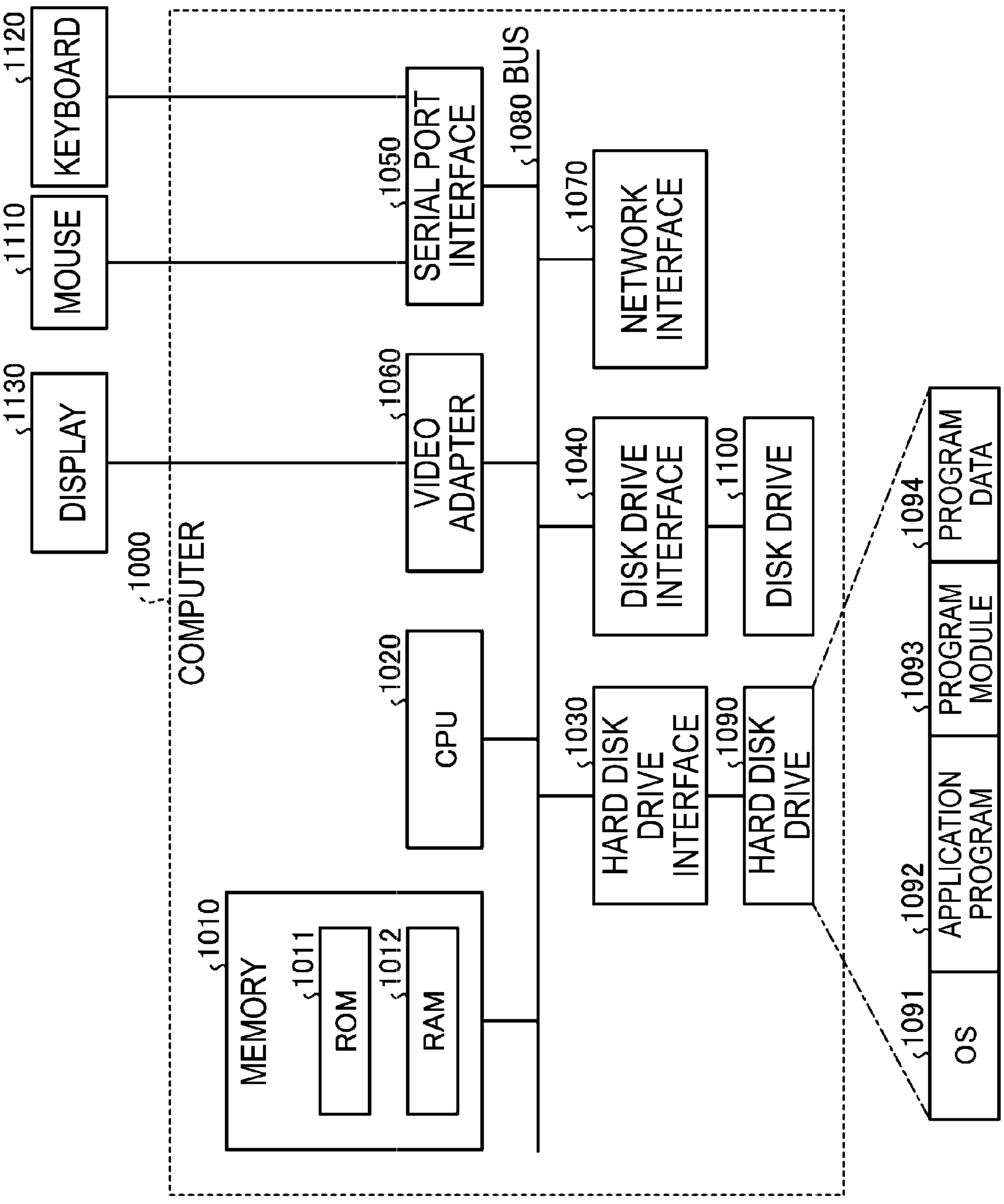
FIG. 22 is a diagram illustrating an example of a computer in which an edge device and a server device are achieved by a program being executed.

FIG. 22 is a diagram illustrating an example of a computer in which the edge devices 30, 230, 330, and 430 and the server devices 20, 220, 320, and 420 are achieved by a program being executed. The computer 1000 includes, for example, a memory 1010 and a CPU 1020. Further, the accelerator described above may be included to assist computation. Further, the computer 1000 includes a hard disk drive interface 1030, a disc drive interface 1040, a serial port interface 1050, a video adapter 1060, and a network interface 1070. Each of these units is connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disc drive interface 1040 is connected to a disc drive 1100. For example, a removable storage medium such as a magnetic disk or an optical disc is inserted into the disc drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program defining the processing of the edge devices 30, 230, 330, and 430 and the server devices 20, 220, 320, and 420 is implemented as the program module 1093 in which a code that can be executed by the computer has been described. The program module 1093 is stored in, for example, the hard disk drive 1090. For example, the program module 1093 for executing the same processing as functional configurations in the edge devices 30, 230, 330, and 430 and the server devices 20, 220, 320, and 420 is stored in the hard disk drive 1090. The hard disk drive 1090 may be replaced with a solid state drive (SSD).

Further, configuration data to be used in the processing of the embodiments described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the program module 1093 or the program data 1094.

The program module 1093 or the program data 1094 is not limited to being stored in the hard disk drive 1090, and may be stored, for example, in a detachable storage medium and read by the CPU 1020 via the disc drive 1100 or the like. Alternatively, the program module 1093 and the program data 1094 may be stored in another computer connected via a network (a local area network (LAN), a wide area network (WAN), or the like). The program module 1093 and the program data 1094 may be read from another computer via the network interface 1070 by the CPU 1020.

Although the embodiments to which the invention made by the present inventors has been applied have been described above, the present disclosure is not limited by the description and the drawings forming a part of the present disclosure according to the present embodiment. That is, all of other embodiments, examples, operation technologies, and the like made by those skilled in the art based on the present embodiment are within the scope of the present disclosure.

REFERENCE SIGNS LIST

10 Training device
11 High-precision model training unit
12 Lightweight model training unit
30, 230, 230A, 330, 430 Edge device
20, 220, 220A, 320, 420 Server device
100, 200, 300, 400 Processing system
111, 121 Estimation unit
112, 122 Loss calculation unit
113, 123 Update unit
114 High-precision model information
124 Lightweight model information
22,32 Inference unit
33 Determination unit
34 Communication unit
223 Decoding unit
235 Encoding unit
240A, 250A NW device
324 Storage unit
325 Inference result database (DB)
336 Addition unit
437 Selection unit

The invention claimed is:

1. A processing system performed using an edge device and a server device, wherein
the edge device includes
processing circuitry configured to:
process processing target data and output a processing result of the processing target data;
determine that the server device is to execute processing of the processing target data when an evaluation value for evaluating which of the edge device and the server device is to process the processing target data satisfies a condition, wherein the evaluation value is based on an intermediate output value of inferencing the target data, and the intermediate output value represents either one of smaller entropy or higher sparsity as compared to other intermediate output values of inferencing the target data;
determine that the evaluation value is included in a range for determining that processing is to be executed by the edge device when the processing result of the processing target data satisfies a predetermined evaluation, and output the processing result of the processing target data processed;
encode, based on the determining that the server device is to execute the processing, the evaluation value as at least a part of data for transmitting to the server device; and
transmit the encoded evaluation value as the at least the part of the data, causing the server device to execute the processing of the processing target data when determining that the server device is to execute the processing of the processing target data, thereby reducing an amount of data communication and further inferencing the target data with accuracy by the server device.

2. The processing system according to claim 1, wherein the evaluation value has a stronger tendency to fall in a range for determining that evaluation is to be executed by the server device as an amount of computation in the processing for the processing target data increases.

3. The processing system according to claim 1, wherein the evaluation value is a value indicating a degree of certainty that an estimation result represents a correct answer.

4. The processing system according to claim 1, wherein the evaluation value is determined based on any one of a time taken to obtain the processing result of the processing target data, an acquisition deadline of the processing result of the processing target data, a use situation of resources of the edge device at a time of the determination, and whether the processing target data is data where an event occurs as compared with other data.

5. The processing system according to claim 1, wherein the evaluation value is calculated based on an intermediate output value of processing of outputting the processing result of the processing target data, the processing being performed, and
the processing circuitry is further configured to transmit the intermediate output value to the server device.

6. The processing system according to claim 5, wherein there are a plurality of edge devices, and
processing performed by each edge device and processing performed by the server device are optimized such that the server device performs the processing related to the processing target data on data transmitted from at least one of the plurality of edge devices.

7. The processing system according to claim 6, wherein the intermediate output value is irreversible with respect to the processing target data,
the edge device transmits the intermediate output value together with a code for identifying the edge device, and
the server device stores a result of analyzing the intermediate output value and the code for identifying the edge device in association with each other.

8. The processing system according to claim 5, wherein the processing of outputting the processing result of the processing target data is inference using a trained neural network, and
the intermediate output value is an output value of an intermediate layer of the trained neural network.

9. The processing system according to claim 5, wherein there are a plurality of server devices, and the processing circuitry is further configured to select one of the plurality of server devices to which data that causes the server device to execute the processing related to the processing target data is to be transmitted according to a purpose of processing the processing target data.

10. The processing system according to claim 1, the processing system further performed using a processor configured to execute operations comprising:

dividing a trained deep neural network (DNN) into a first DNN and a second DNN at a point between an intermediate layer of the trained DNN and an immediately subsequent layer of the intermediate layer of the trained DNN, wherein the first DNN comprises the intermediate layer, and the second DNN comprises the immediately subsequent layer;

disposing the first DNN disposed in the edge device; and disposing the second DNN in the server device.

11. A processing method executed by a processing system performed using an edge device and a server device, the processing method comprising:

by the edge device, processing target data and outputting a processing result of the processing target data;

by the edge device, determining that the server device is to execute processing of the processing target data when an evaluation value for evaluating which of the edge device and the server device is to process the processing target data satisfies a condition, wherein the evaluation value is based on an intermediate output value of inferencing the target data, and the intermediate output value represents either one of smaller entropy or higher sparsity as compared to other intermediate output values of inferencing the target data:

determining that the evaluation value is included in a range for determining that processing is to be executed by the edge device when the processing result of the processing target data satisfies a predetermined evaluation, and outputting the processing result of the processing target data processed in the processing, by processing circuitry; and encode, based on the determining that the server device is to execute the processing, the evaluation value as at least a part of data for transmitting to the server device;

transmitting the encoded evaluation value as the at least the part of the data, causing the server device to execute the processing of the processing target data when it is determined in the determining that the server device is to execute the processing of the processing target data, thereby reducing an amount of data communication and further inferencing the target data with accuracy by the server device.

* * * * *